United States Patent [19]

Shiomi

[11] Patent Number: 5,740,457

[45] Date of Patent: Apr. 14, 1998

[54] ELECTRONIC DICTIONARY, ITS PRODUCTION METHOD, AND INDEX COMPRESSION AND DECOMPRESSION DEVICE

[75] Inventor: Takakazu Shiomi, Osaka, Japan

[73] Assignee: Matsushita Electric Ind., Osaka, Japan

[21] Appl. No.: 609,358

[22] Filed: Mar. 1, 1996

[30] Foreign Application Priority Data

Mar. 3, 1995 [JP] Japan .................................. 7-044565

[51] Int. Cl.$^6$ ................................................ G06F 12/00
[52] U.S. Cl. ............. 395/795; 395/421.06; 395/421.07; 395/421.1
[58] Field of Search .................... 395/750–760, 395/794–95, 616, 421.1, 421.06, 421.07, 421.03

[56] References Cited

U.S. PATENT DOCUMENTS

| | | | |
|---|---|---|---|
| 5,136,699 | 8/1992 | Yokoyama | 395/421.1 |
| 5,210,853 | 5/1993 | Nakasuji | 395/601 |
| 5,522,053 | 5/1996 | Yoshida | 395/421.03 |
| 5,592,637 | 1/1997 | Matsuo | 395/584 |
| 5,608,886 | 3/1997 | Blomgren | 395/586 |
| 5,611,065 | 3/1997 | Alferness | 395/421.1 |
| 5,655,139 | 8/1997 | Thomson | 395/800.32 |

OTHER PUBLICATIONS

P. Bujakiewicz, "Determination of Perturbation Index of a DAE with Maximum Weighted Matching Algorithm", pp. 129–136, May 1994.

"Data Structure and Program Technique," by Ogiwara et al., pp. 172–176, 1987 (with partial translation).

*Primary Examiner*—Thomas G. Black
*Assistant Examiner*—Diane Mizrahi
*Attorney, Agent, or Firm*—Price, Gess & Ubell

[57] ABSTRACT

An electronic dictionary comprises a dictionary medium; dictionary data composed of a plurality of dictionary data elements and stored in the dictionary medium; and an index file showing storage positions of all dictionary data elements and being stored in the dictionary medium, wherein the index file is a differential index in which each item is expressed by a differential between a pointer showing a storage position of a dictionary data element and a given function value, with each item of the differential index being expressed by a bit length equal to or shorter than maximum bit length for showing a storage position of a dictionary data element.

10 Claims, 31 Drawing Sheets

Fig. 15

1401 binary index file

| | | |
|---|---|---|
| 0 | 00 | 00 |
| 1 | 00 | 18 |
| 2 | 00 | 28 |
| ⋮ | | |
| 46 | 03 | 20 |
| 47 | 03 | 30 |
| 48 | 04 | 5C |
| ⋮ | | |
| 106 | 47 | 1C | low-order 1byte
high-order 1byte 1303
index numbers

| index numbers | function |
|---|---|
| 0~47 | Y=17X |
| 48~106 | Y=295X−13044 |

Fig. 30
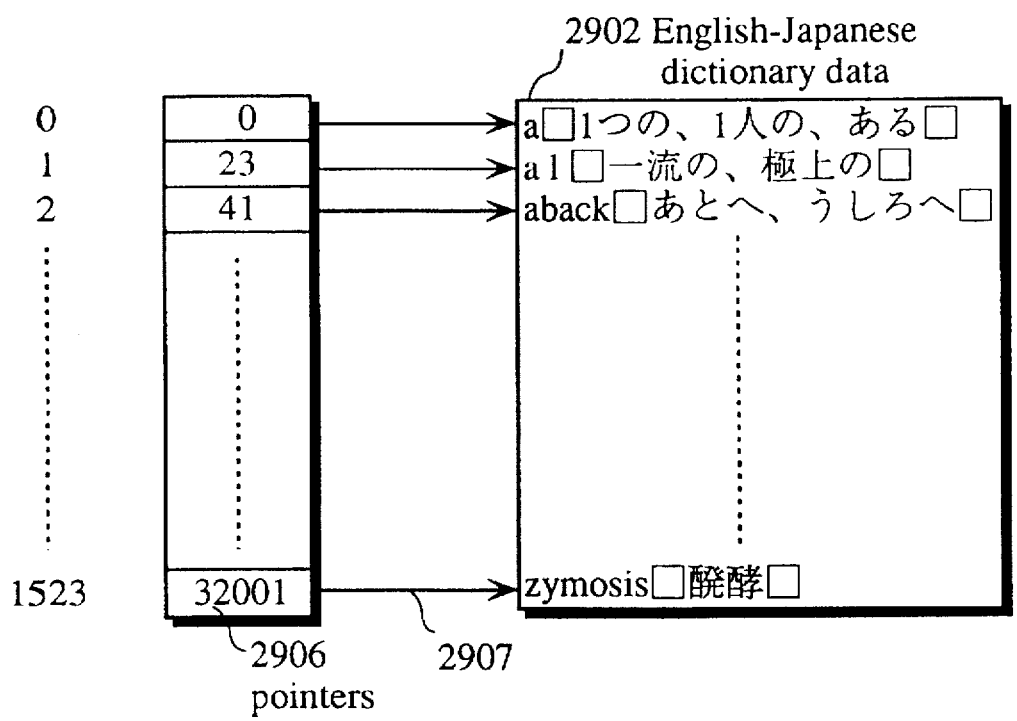
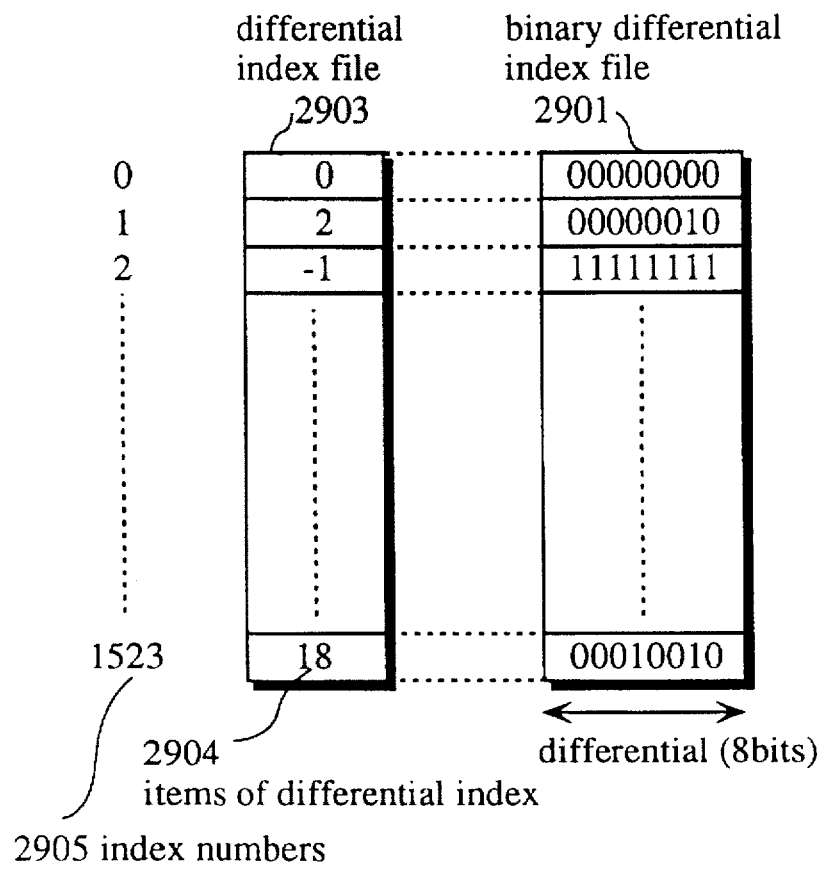

ELECTRONIC DICTIONARY, ITS PRODUCTION METHOD, AND INDEX COMPRESSION AND DECOMPRESSION DEVICE

BACKGROUND OF THE INVENTION

1. Field of the Invention

The present invention relates to an electronic dictionary, especially, to a compression method and device and decompression device of an index which shows a storage position of a data element in an electronic dictionary.

2. Description of the Related Art

FIG. 1 shows an example of a conventional electronic English-Japanese dictionary. It comprises English-Japanese dictionary data 3501 and index file 3503; English-Japanese dictionary data 3501 includes a plurality of dictionary data elements each composed of an English headword and its translation, and index file 3503 is a set of pointers 3502 which show storage positions of each dictionary data element in English-Japanese dictionary data 3501.

Dictionary data elements of different sizes are stored in the English dictionary data. There's no data space between each dictionary data element. In order to retrieve dictionary data elements quickly, index file 3503 includes pointers 3502, each of which shows the start of a storage position of each dictionary data element. Here, each pointer has a same data length which is set as S. For example, when accessing the Tth dictionary data element in English-Japanese dictionary data 3501 with the first dictionary data element being "0th", the start of its storage position can be obtained by referring to data of length S at a position which is S*T from the head of index file 3503. It is also possible to search an electronic English-Japanese dictionary by using inputted English key word. This method is categorized into table search. Sequential search and binary search are mentioned in "Data Structure and Program Technique", page 172 to 176 (1987, Hiroshi Ogiwara, Seiichi Nishihara, Oum-sha Shuppan). According to sequential search, an English headword of each dictionary data element and an English key word are compared according to the storage order of data elements. At this time, index file 3503 makes it easy to obtain a start of a storage position of each dictionary data element, comparing English headwords and English key words quickly.

However, storage capacity of index file 3503 mentioned above becomes big as the size of all pointers 3502 is set to the size which shows the start of the storage position of the last dictionary data element.

Also, if index file 3503 does not exist, it is necessary to examine English-Japanese dictionary data 3501 one by one from the beginning in order to find a start of a storage position of each data element, which requires much retrieving time.

On the other hand, even if index file 3503 does not exist, quick retrieval can be realized by making the size of all the dictionary data element the same. However, capacity of English-Japanese dictionary data 3501 becomes huge as the size of all dictionary data elements is set to the size of the biggest dictionary data element.

SUMMARY OF THE INVENTION

It is an object of the present invention to provide an electronic dictionary including an index file having compact storage capacity.

Another object of the present invention is to provide a method of compressing the capacity of the conventional index file.

A further object of the present invention is to provide an index compression device.

Yet another object of the present invention is to provide an index decompression device which restores a compressed index.

The objects are attained by the following features.

(1) An electronic dictionary comprises a dictionary medium; dictionary data composed of a plurality of dictionary data elements and stored in the dictionary medium; and an index file showing storage positions of all dictionary data elements and being stored in the dictionary medium, wherein the index file is a differential index in which each item is expressed by a differential between a pointer showing a storage position of a dictionary data element and a given function value, with each item of the differential index being expressed by a bit length equal to or shorter than maximum bit length for showing a storage position of a dictionary data element.

(2) An electronic dictionary comprises a dictionary medium; dictionary data composed of a plurality of dictionary data elements and stored in the dictionary medium; and an index file showing storage positions of all dictionary data elements and being stored in the dictionary medium, wherein the index file is a differential index in which each item is expressed by a differential between a pointer showing a storage position of a dictionary data element and a given function value, with the given function value being obtained by substituting an index number into an approximation function for predicting a pointer.

According to (1) and (2), it is possible to obtain an index file having compact storage capacity, thereby resulting in producing an electronic dictionary at small cost.

(3) The electronic dictionary may comprise different types of dictionary data stored in the dictionary data medium, the index file may further include function information for obtaining a given function value, and the differential index may include identifiers for identifying types of the dictionary data.

(4) A function shown by the function information may be a linear function, and the function information may include a number of functions, an inclination and an intercept of each function, the number of function corresponding to a number of the identifiers.

According to (3) and (4), it is possible to obtain an index file of an electronic dictionary including a plurality of dictionary data, which has compact storage capacity.

(5) A method of producing an electronic dictionary comprises a dictionary medium; dictionary data composed of a plurality of dictionary data elements and stored in the dictionary medium; and an index file showing storage positions of all dictionary data elements and being stored in the dictionary medium, having the steps of dictionary data storing for storing dictionary data in an area in the dictionary medium; function calculation for calculating a prediction pointer by substituting an index number into an already stored function for predicting a pointer; differential calculation for calculating a differential between a pointer in an index file composed of pointers each showing a storage position of a dictionary data element in the dictionary medium and the prediction pointer calculated in the step of function calculation; obtaining for obtaining the differential calculated in the step of differential calculation; and data storage for storing the differential obtained in the step of obtaining in an another area in the dictionary medium.

According to (5), it is possible to produce an electronic dictionary having compact storage capacity of a pointer of an index file by using a differential.

(6) The method of producing the electronic dictionary may further comprise, between the steps of dictionary data storing and function calculation, the step of function selection for selecting a function from a plurality of prediction functions in accordance with the pointer in the index file, the step of function calculation may include the sub-step of calculating a prediction pointer using the function selected in the step of function selection, and the step of obtaining may include the sub-step of obtaining a pair of the differential and a function identifier which identifies the function selected in the step of function selection.

According to (6), it is possible to produce an electronic dictionary having compact storage capacity when a plurality of dictionary data are included.

(7) An index compression device for compressing an index for retrieving a desired data element from a plurality of data elements into a shorter bit length than a pointer bit length for showing a storage position of a data element, comprises a input device for inputting an index file composed of pointers each showing a storage position of a data element; an index file temporary storage device for temporarily storing the inputted index file; a prediction function storage device for storing a function for predicting each pointer; a function calculation device for calculating a prediction pointer by obtaining a function from the prediction function storage device and substituting an index number into the function; a prediction pointer temporary storage device for temporarily storing the prediction pointer calculated by the function calculation device; a differential calculation device for calculating a differential between a pointer stored in the index file temporary storage device and its corresponding prediction pointer stored in the prediction pointer temporary storage device; and an output device for outputting the differential calculated by the differential calculation device.

According to (7), it is possible to compress an index file by using a differential as an index instead of a pointer.

(8) The index compression device may further include a function selection device for selecting a function from a plurality of functions stored in the prediction function storage device in accordance with each pointer stored in the index file temporary storage device, the prediction function storage device may contain a plurality of functions, the function calculation device may include a selected function obtaining unit for obtaining the function selected by the function selection device from the prediction function storage device, and the output device may include a differential function identifier output unit for outputting a pair of the differential and a function identifier which identifies the function selected by the function selection device.

According to (8), it is possible to compress an index file having a plurality of data.

(9) An index compression device for compressing an index for retrieving a desired data element from a plurality of data elements into a shorter bit length than a pointer bit length for showing a storage position of a data element, comprises input device for inputting an index file composed of pointers each showing a storage position of a data element; an index file temporary storage device for temporarily storing the inputted index file; a constant storage device for storing an inclination and an intercept of a linear function which predicts each pointer; a function calculation device for obtaining the inclination and the intercept stored in the constant storage device and calculating a prediction pointer by multiplying the inclination with an index number and then adding the intercept to it; a prediction pointer temporary storage device for temporarily storing the prediction pointer calculated by the function calculation device; a differential calculation device for calculating a differential between a pointer stored in the index file temporary storage device and its corresponding prediction pointer stored in the prediction pointer temporary storage device; and an output device for outputting the differential calculated by the differential calculation device.

According to (9), it is possible to cut back on a storage area in the constant storage device.

(10) An index compression device for compressing an index for retrieving a desired data element from a plurality of data elements into a shorter bit length than a pointer bit length for showing a storage position of a data element, comprises an input device for inputting an index file composed of pointers each showing a storage position of a data element; an index file temporary storage device for temporarily storing the inputted index file; a first prediction function creation device for creating a function which predicts each pointer from the last pointer stored in the index file temporary storage device and the last index number; a first prediction function storage device for storing the function created by the first prediction function creation device; a first prediction function calculation device for calculating a prediction pointer by obtaining a function from the first prediction function storage device and substituting an index number into the function; a prediction pointer temporary storage device for temporarily storing the prediction pointer calculated by the first function calculation device; a first differential calculation device for calculating a differential between a pointer stored in the index file temporary storage device and its corresponding prediction pointer stored in the prediction pointer temporary storage device; a differential temporary storage device for temporarily storing the differential calculated by the first differential calculation device; a differential range storage device storing upper and lower limits of a differential; a differential determination device for determining whether each differential stored in the differential temporary storage device is within the differential range stored in the differential range storage device; a first output device for outputting the differential stored in the differential temporary storage device and the function stored in the first prediction function storage unit when the differential is within the differential range; a block division device for calculating an amount of change of increments of all pointers stored in the index file temporary storage device and dividing the index file at a pointer whose amount of change of increment exceeds a given value, when the differential is not within the differential range; a second prediction function creation device for creating different functions for predicting each pointer in each block divided by the block division device; a list creation temporary storage device for creating and temporarily storing a list of the blocks divided by the block division device and the functions created by the second prediction function creation device; a second function calculation device for calculating a prediction pointer by obtaining the functions stored in the list creation temporary storage device and substituting an index number into the functions; a second prediction pointer temporary storage device for storing the prediction pointer calculated by the second function calculation device; a second differential calculation device for calculating a differential between a pointer stored in the index file temporary storage device and its corresponding prediction pointer stored in the second prediction pointer temporary storage device; a second differential temporary storage device for temporarily storing the differential calculated by the second differential calculation device; and a second output device for outputting the list stored in the list creation temporary storage device and the differential stored in the second differential temporary storage device.

(11) The functions created by the first and the second prediction function creation device may be linear functions.

According to (10) and (11), it is possible to determine a prediction function from a pointer in an index file and to select a bit length of an area for storing a differential within a differential range.

(12) An index decompression device includes a prediction function storage device for storing a function for predicting a pointer of each data element in a data file; an input device for inputting a differential index file composed of differentials between pointers of each data element and their corresponding prediction pointers which are predicted by the function stored in the prediction function storage device; a differential index file temporarily storage device for temporarily storing the differential index file inputted by the input device; an index number designation device for designating an index number given to differentials when they are stored in the differential temporary storage device; a function calculation device for calculating a prediction pointer by substituting the index number designated by the index number designation device into the function stored in the prediction function storage device; a pointer calculation device for calculating a pointer by adding the prediction pointer calculated by the function calculation device and the differential stored in the differential index file temporarily storage device; and an output device for outputting the pointer calculated by the pointer calculation device.

According to (12), it is possible to retrieve a data element using a compressed index.

(13) The prediction function storage device may include a function input unit for inputting a plurality of functions which predict pointers of each data element in the data file; and a prediction function storage unit for storing the function inputted from the prediction function input unit, and the function calculation device may include a selection unit for selecting a function from a plurality of functions stored in the prediction function storage unit based on the index number designated by the index number designation device; and a function calculation unit for calculating a prediction pointer by substituting an index number into the function selected by the selection unit.

According to (13), it is possible to easily restore a pointer even if a differential index is calculated by a plurality of functions.

BRIEF DESCRIPTION OF THE DRAWINGS

These and other objects, advantages and features of the invention will become apparent from the following description thereof taken in conjunction with the accompanying drawings which illustrate a specific embodiment of the invention. IN the drawings:

FIG. 15 shows an index file shown in FIG. 14 expressed in binary notation;

FIG. 30 shows an example of a differential index file to be decompressed and an English-Japanese dictionary including it in the present embodiment;

DESCRIPTION OF THE EMBODIMENTS

(First Embodiment)

Figure 1:
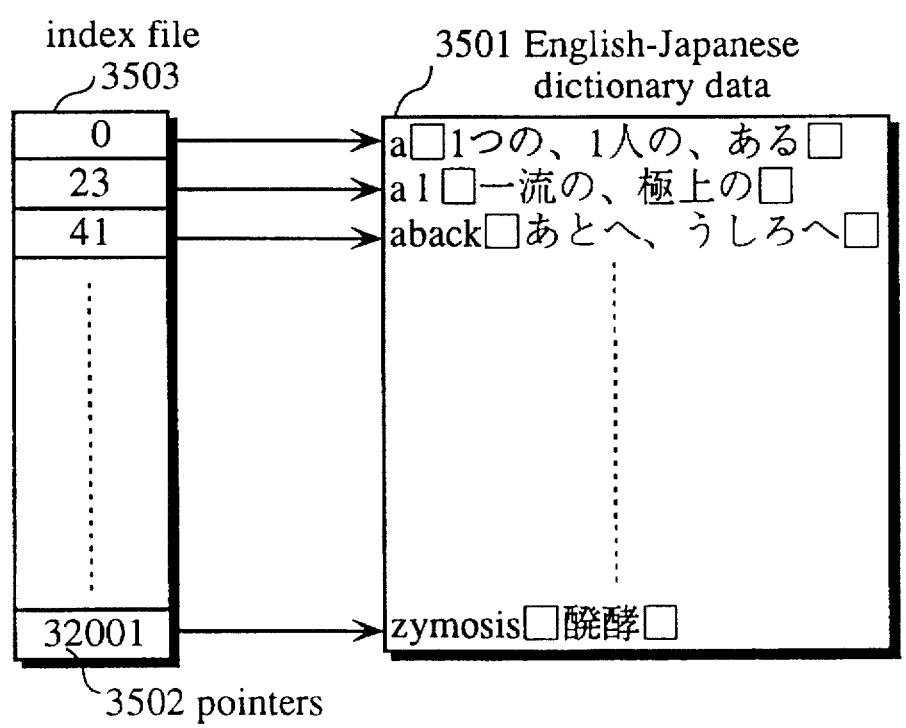
FIG. 1 shows a conventional English-Japanese dictionary which includes an index file.
Figure 2:
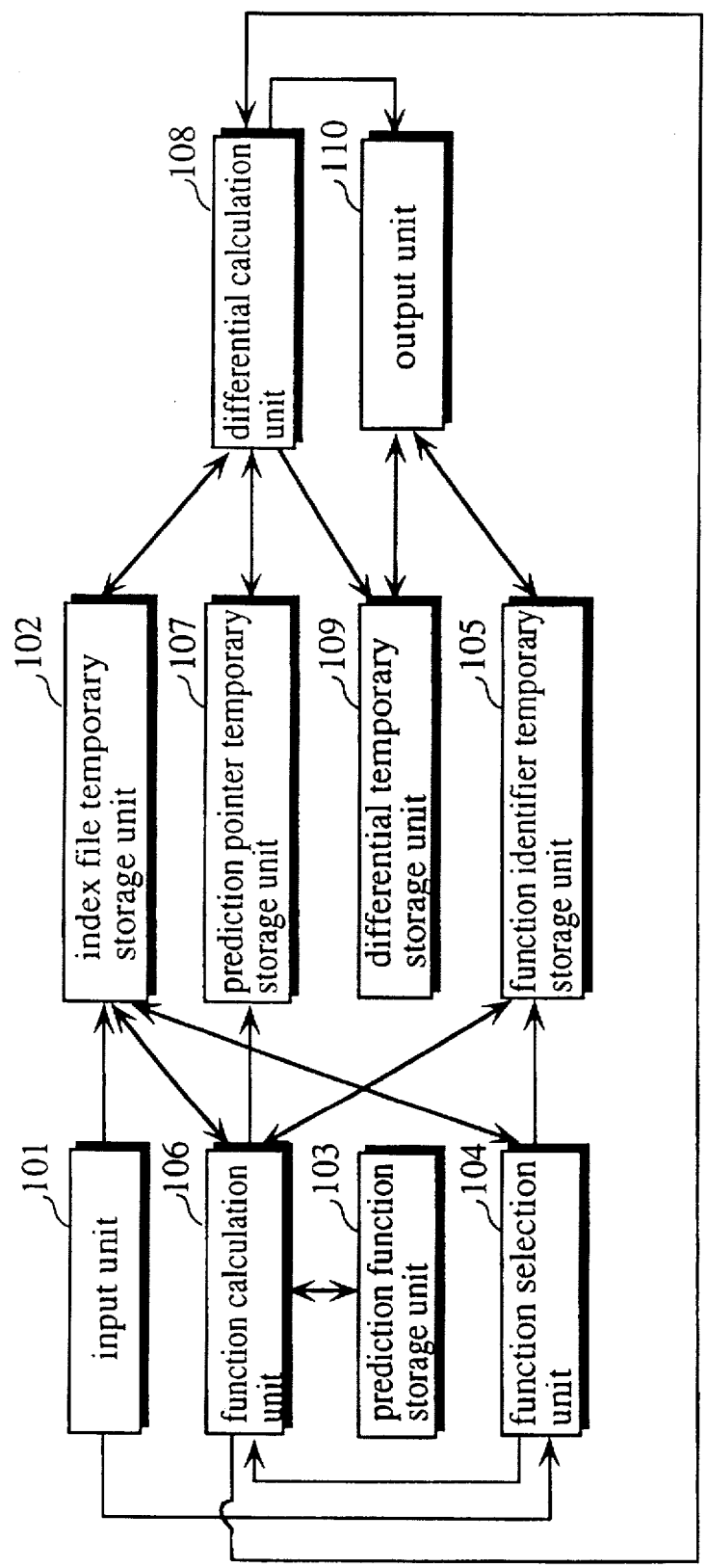
FIG. 2 shows configuration of an index compression device of the first embodiment of the present invention.

FIG. 2 shows configuration of the index compression device of the first embodiment of the present invention.

The index compression device comprises input unit 101, index file temporary storage unit 102, prediction function storage unit 103, function selection unit 104, function identifier temporary storage unit 105, function calculation unit 106, predication pointer temporary storage unit 107, differential calculation unit 108, differential temporary storage unit 109, and output unit 110.

On receiving input of index file which has pointers, input unit 101 makes index file temporary storage unit 102 temporarily store the index file, and activates function selection unit 104.

Index file temporary storage unit 102 temporarily stores the index file. Specific examples of index file temporary storage unit 102 is a high-speed semiconductor memory and the like.

Figure 3:
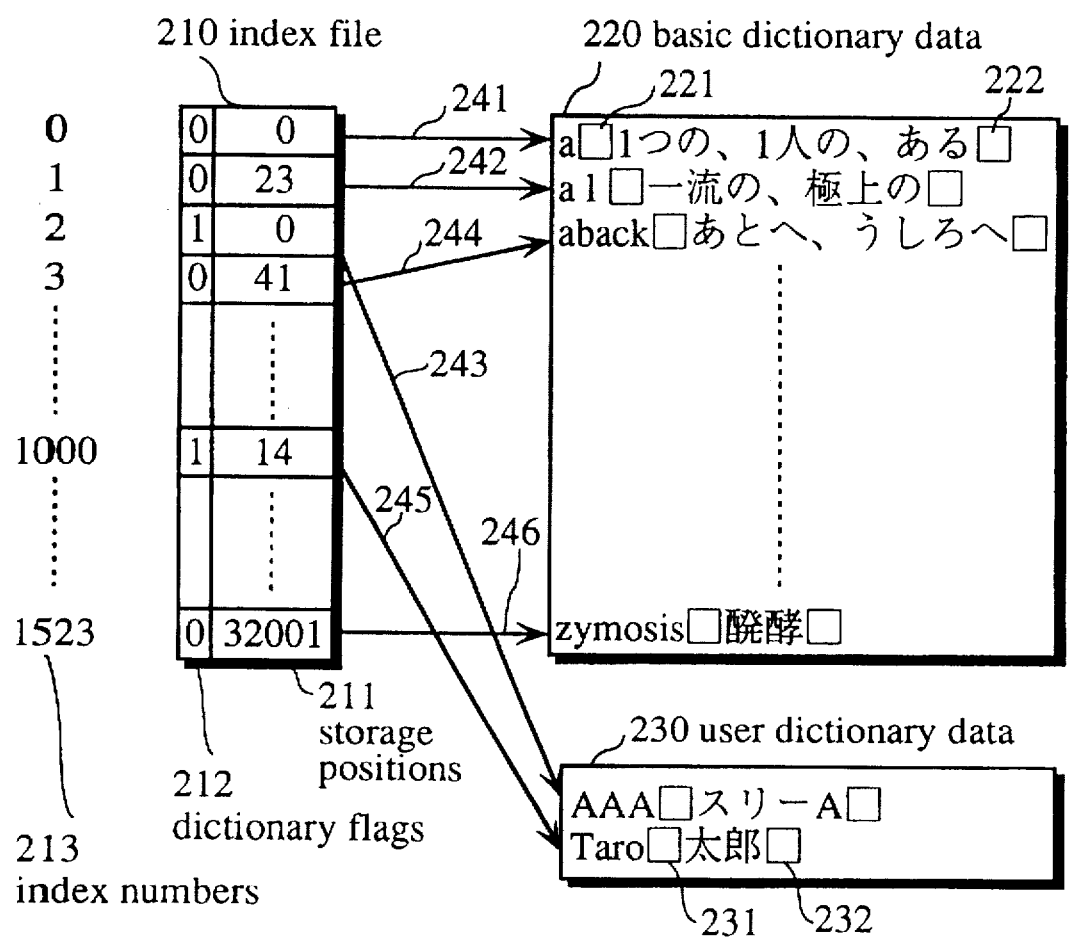
FIG. 3 shows an example of an English-Japanese dictionary which includes an index file to be compressed in the present embodiment.

FIG. 3 shows contents of index file 210, which is stored in index file temporary storage unit 102. Index file 210 comprises a set of pointers, each of which having storage position 211 and dictionary flag 212; storage position 211 shows storage position of each dictionary data element in both basic dictionary data 220 and user dictionary data 230, and dictionary flag 212 shows which of the dictionary data includes the dictionary data element being searched for. When there is only one type of dictionary data, dictionary flag 212 can be omitted.

Index numbers 213 are given to pointers according to the order when they are stored when input unit 101 makes index file temporary storage unit 102 temporarily store the index file. In FIG. 3, index number of the last pointer is "1523". It means that total number of data elements in basic dictionary data 220 and user dictionary data 230 is "1524".

Contents of basic dictionary data 220 and user dictionary data 230 can be explained as follows. Basic dictionary data 220 and user dictionary data 230 are stored in a data file storage unit like a magnetic disc and the like (not illustrated). □ represents a token after an English headword and its translation. An English character is represented by one byte, a Japanese character by two bytes, and a token by one byte. So the first data element in basic dictionary data 220 can be represented by 23 bytes and the next data element by 18 bytes. There is no data space between data elements. When dictionary flag 212 is "0", it means that the data element being searched for exists in basic dictionary data 220; on the other hand, when dictionary flag 212 is "1", it means that the data element being searched for exists in user dictionary data 230.

Storage position 211 of each data element can be represented by byte from the beginning of basic dictionary data 220 or user dictionary data 230. In FIG. 3, the pointer having index number "0" has "0" as dictionary flag 212 and storage position 211; it shows that the data element having a headword "a" exists at the beginning of basic dictionary data 220. The pointer having index number "2" has "1" as dictionary flag 212 and "0" as storage position 211; it shows that the data element having a headword "AAA" exists at the beginning of user dictionary data 230. The pointer having index number "3" has "0" as dictionary flag 212 and "41" as storage position 211; it shows that the data element having a headword "aback" exists at the 41st byte of basic dictionary data 220. Such relations between index file 210, basic dictionary data 220, and user dictionary data 230 are represented by arrows 241 to 246 in FIG. 3.

Figure 4:
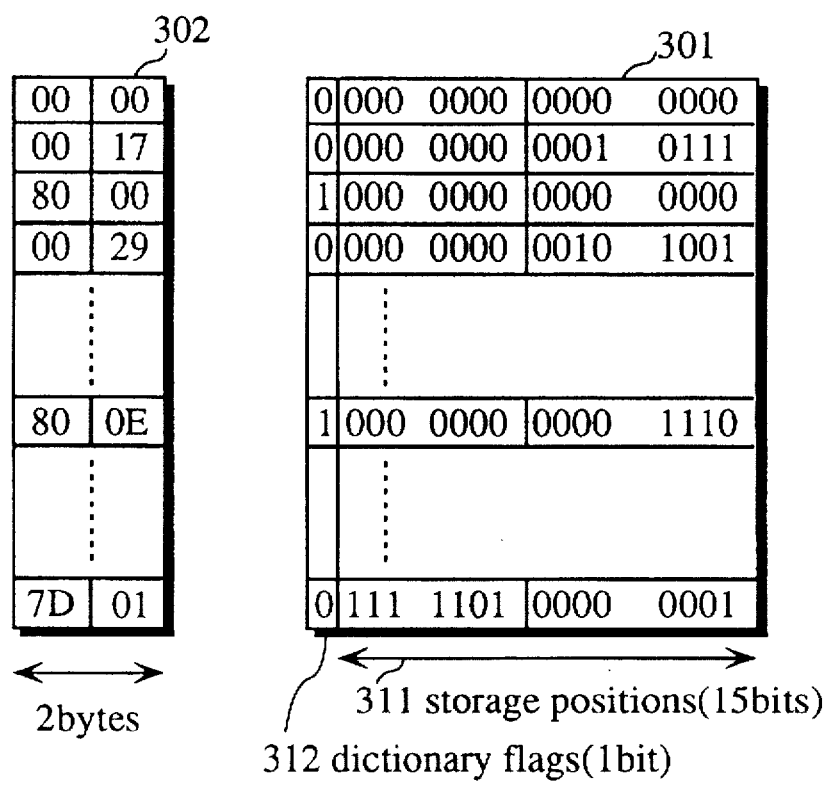
FIG. 4 shows an index file in FIG. 3 expressed in binary notation.

FIG. 4 shows index file 301 expressed in binary notation and index file 302 expressed in hexadecimal notation. Index file 210 is stored as index file 301 in a high-speed semiconductor memory. In index file 301, the most significant bit of the high-order byte represents dictionary flag 312, and the rest of the 15 bits represent storage position 311. In the present embodiment, each pointer in index file 210 is expressed in two bytes.

Figure 5:
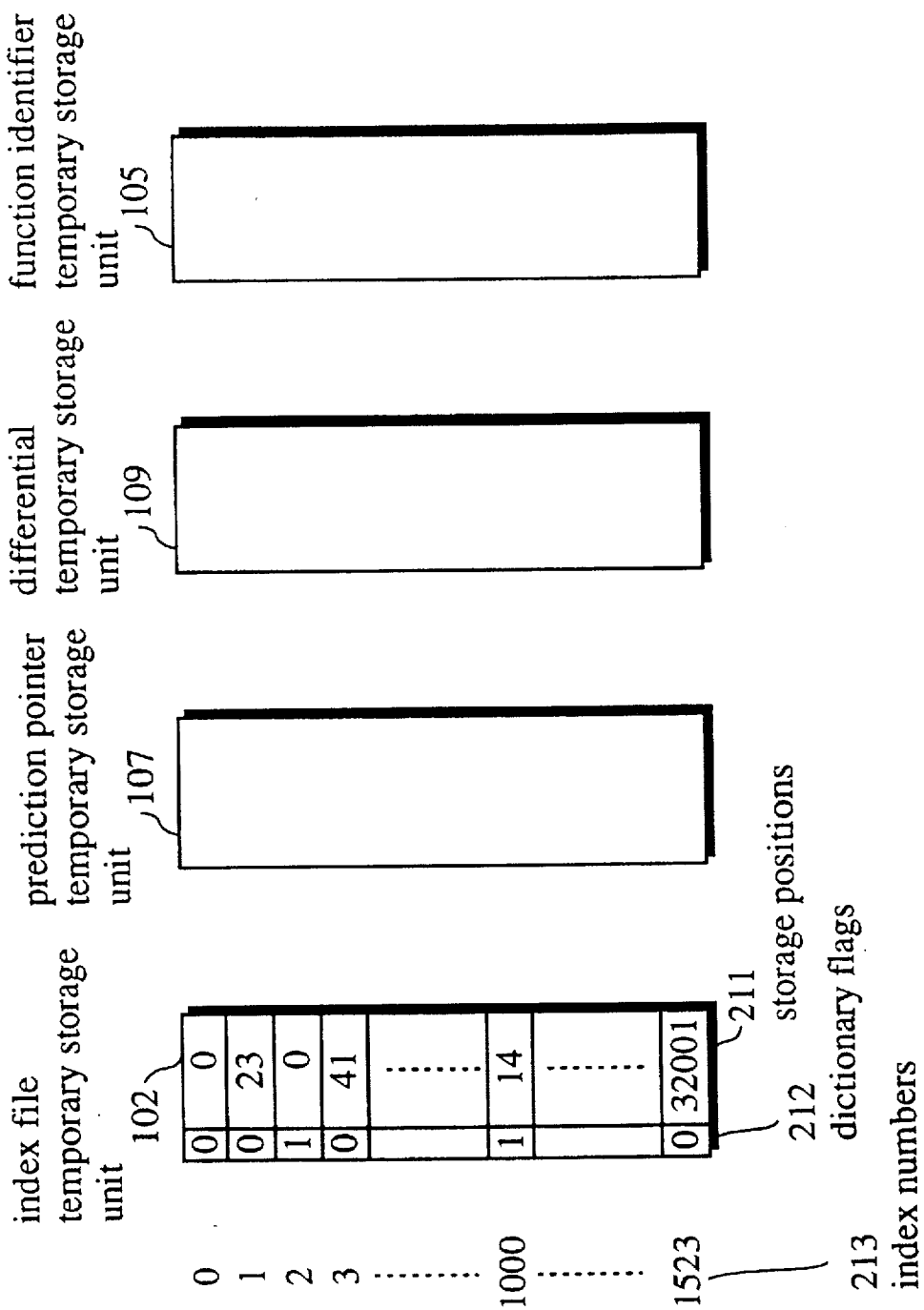
FIG. 5 shows contents of each temporary storage unit right after index file is inputted in the present embodiment.

FIG. 5 shows state of index file temporary storage unit 102, prediction pointer temporary storage unit 107, differential temporary storage unit 109, and function identifier temporary storage unit 105 right after index file 210 shown in FIG. 3 is inputted by input unit 101.

Figure 6:
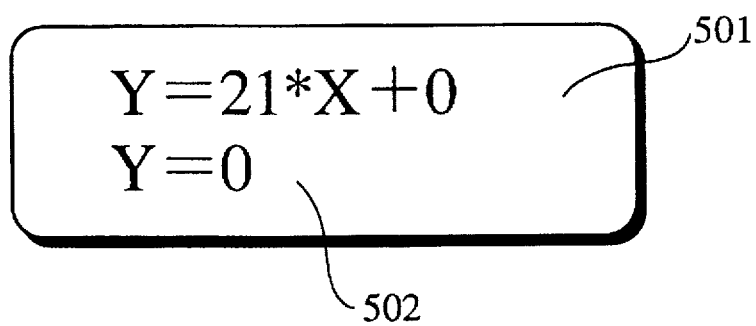
FIG. 6 shows contents of a prediction function storage unit in the present embodiment.

Prediction function storage unit 103 stores prediction functions so as to calculate prediction pointers. Specific examples of prediction function storage unit 103 are a magnetic disc, a high-speed semiconductor memory and the like. Prediction function storage unit 103 has the first prediction function 501 and second prediction function 502, both of which are shown in FIG. 6. The first prediction function 501 is $Y=21X$ and the second prediction function 502 is $Y=0$, with X being input variable and Y being output variable.

Function selection unit 104 selects a prediction function stored in prediction function storage unit 103. On being activated by input unit 101, function selection unit 104 reads out dictionary flag 212 temporarily stored in index file temporary storage unit 102 according to the order of storage. When dictionary flag 212 is "0", function selection unit 104 makes function identifier temporary storage unit 105 temporarily store an identifier "0" which identifies the first prediction function 501; when dictionary flag 212 is "1", function selection unit 104 makes function identifier temporary storage unit 105 temporarily store an identifier "1" which identifies the second prediction function 502. When the processing is completed for the pointer having "1523" as index number 213, function selection unit 104 activates function calculation unit 106.

Figure 7:
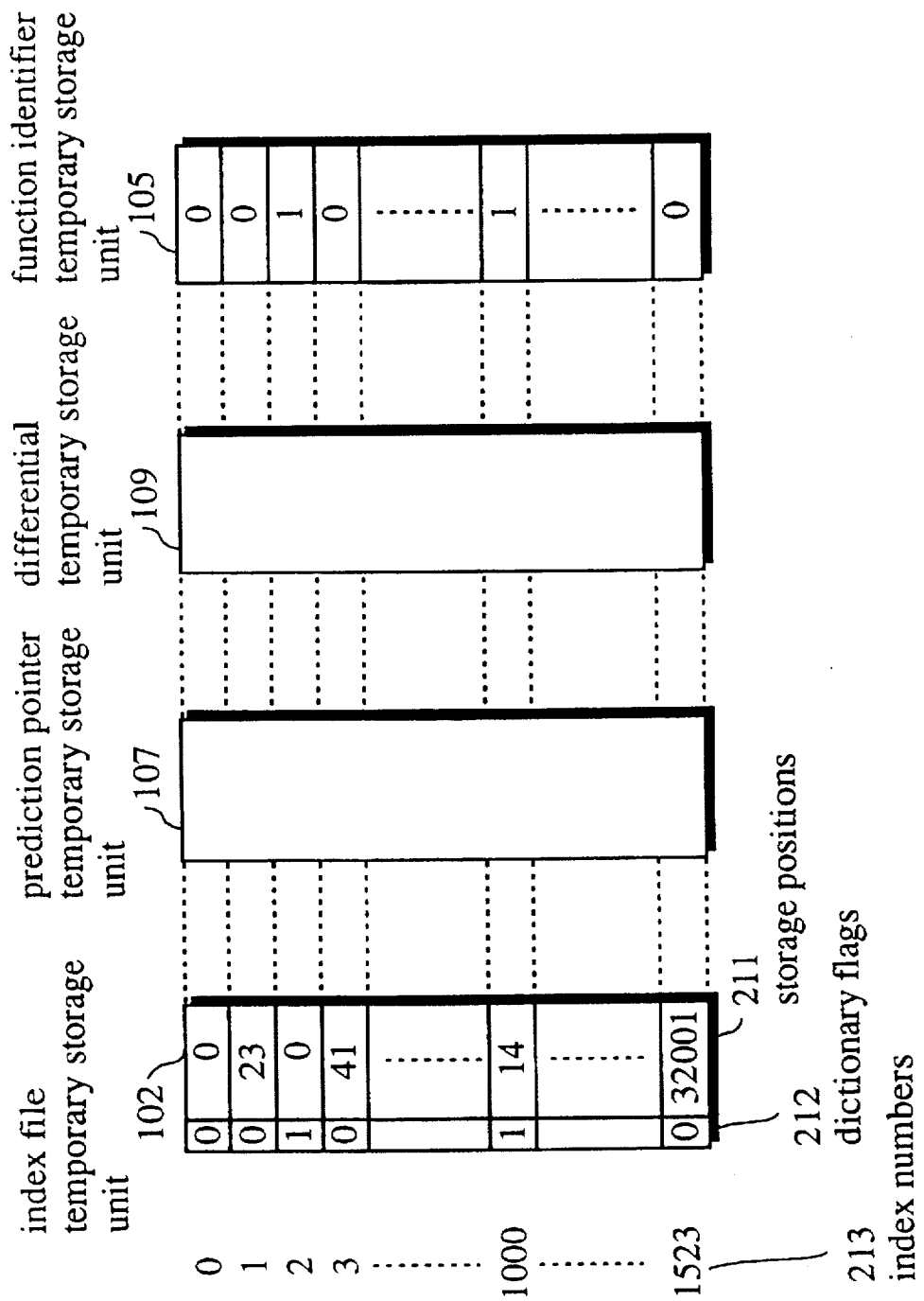
FIG. 7 shows contents of each temporary storage unit in the present embodiment.

Function identifier temporary storage unit 105 temporarily stores identifiers corresponding to the function selected by function selection unit 104. Specific examples of function identifier temporary storage unit 105 are a high-speed semiconductor memory and the like. Contents of function identifier temporary storage unit 105 is shown in FIG. 7.

Function calculation unit 106 calculates a prediction pointer by: reading out an identifier temporarily stored in function identifier temporary storage unit 105; obtaining a function to be used from prediction function storage unit 103; and substituting an index number corresponding to the pointer temporarily stored in index file temporary storage unit 102. On being activated by function selection unit 104, function calculation unit 106 calculates prediction pointers one by one from "0" to "1523" of index number 213. For example, in order to obtain the prediction pointer of "0" of index number 213, function calculation unit 106 reads out identifier "0" temporarily stored in function identifier temporary storage unit 105, obtains Y=21X in prediction function storage unit 103, which is identified by identifier "0", substitutes "0" of index number 213 for the input variable, calculates a prediction pointer by Y=21*0=0, and makes prediction pointer temporary storage unit 107 temporarily store the prediction pointer. On completing such processing for a prediction pointer of "1523" of index number 213, function calculation unit 106 activates differential calculation unit 108.

Figure 8:
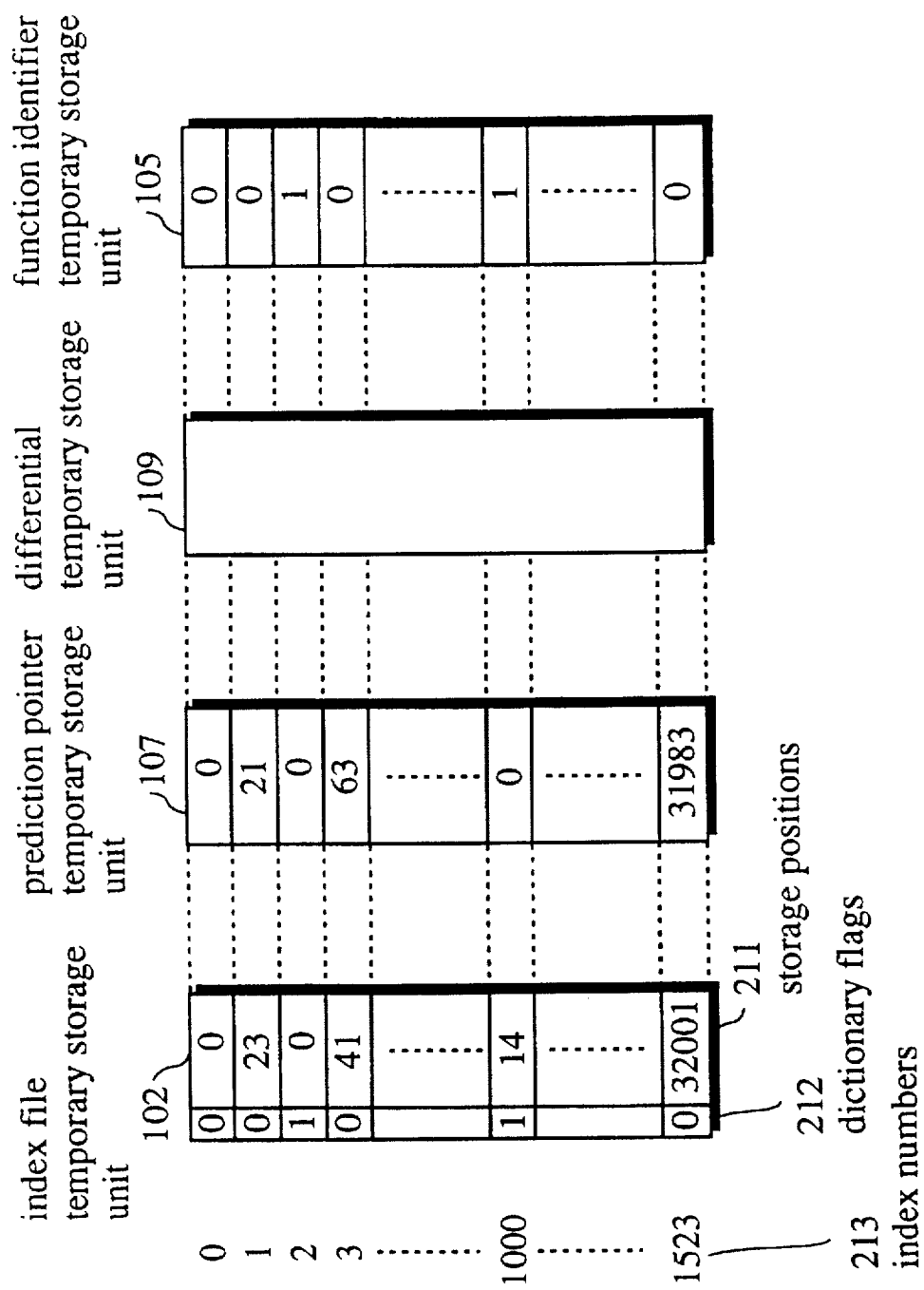
FIG. 8 shows contents of each temporary storage unit in the present embodiment.

Prediction pointer temporary storage unit 107 temporarily stores prediction pointers calculated by function calculation unit 106. Specific examples of prediction pointer temporary storage unit 107 are a high-speed semiconductor memory and the like. FIG. 8 shows prediction pointer temporary storage unit 107 which temporarily stores all prediction pointer calculated by function calculation unit 106.

Differential calculation unit 108 calculates a differential between a pointer temporarily stored in index file temporary storage unit 102 and a predication pointer temporarily stored in prediction pointer temporary storage unit 107. Specifically, on being activated by function calculation unit 106, differential calculation unit 108 reads out storage position 211 of index file temporary storage unit 102 and a prediction pointer in prediction pointer temporary storage unit 107, subtracts the prediction pointer from storage position 211, and makes differential temporary storage unit 109 temporarily store the differential. Differential calculation unit 108 repeats such processing from "0" to "1523" of index number 213. On completing calculation of all differentials, differential calculation unit 108 activates output unit 110.

Figure 9:
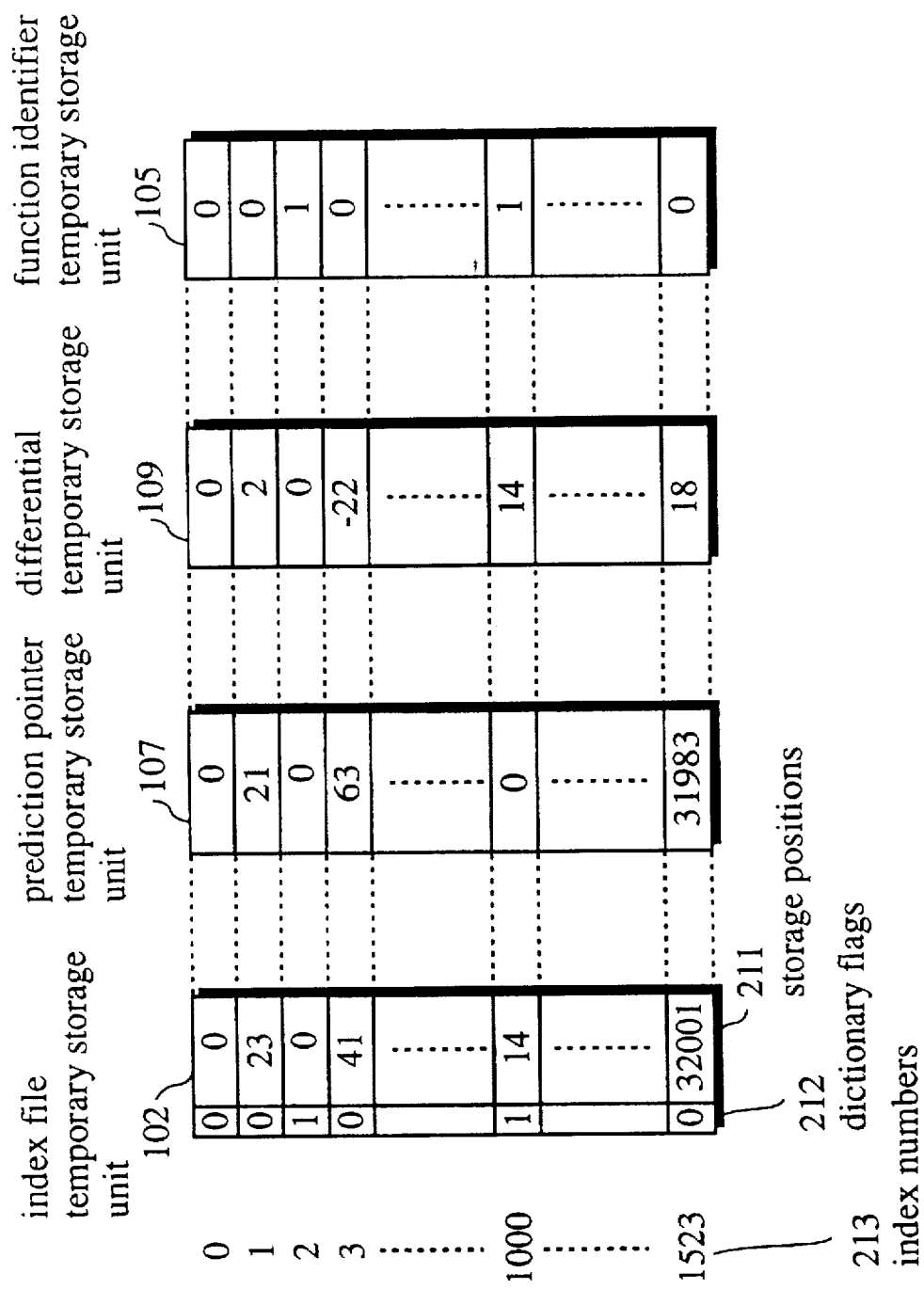
FIG. 9 shows contents of each temporary storage unit in the present embodiment.

Differential temporary storage unit 109 temporarily stores differentials calculated by differential calculation unit 108. Specific examples of differential temporary storage unit are a high-speed semiconductor memory and the like. FIG. 9 shows differential temporary storage unit 109 which temporarily stores all differentials calculated by differential calculation unit 108.

Figure 10:
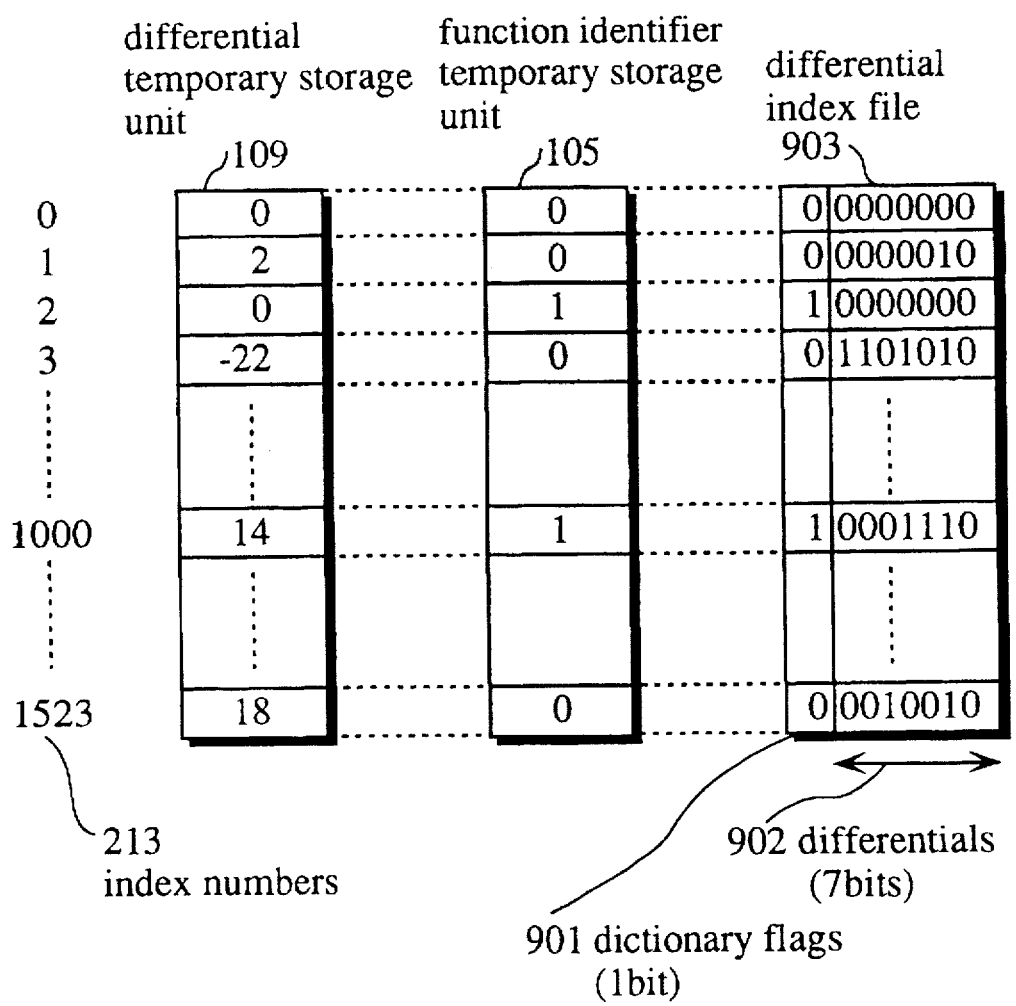
FIG. 10 shows contents of a differential temporary storage unit, a function identifier temporary storage unit and a differential index file to be outputted.

On being activated by differential calculation unit 108, output unit 110 outputs a differential index to storage unit (not illustrated), the differential index being a pair of differentials temporarily stored in differential temporary storage unit 109 and the identifiers temporarily stored in function identifier temporary storage unit 105. FIG. 10 shows differential index file 903 which is a set of pairs of dictionary flag 901 and differential 902.

Figure 11:
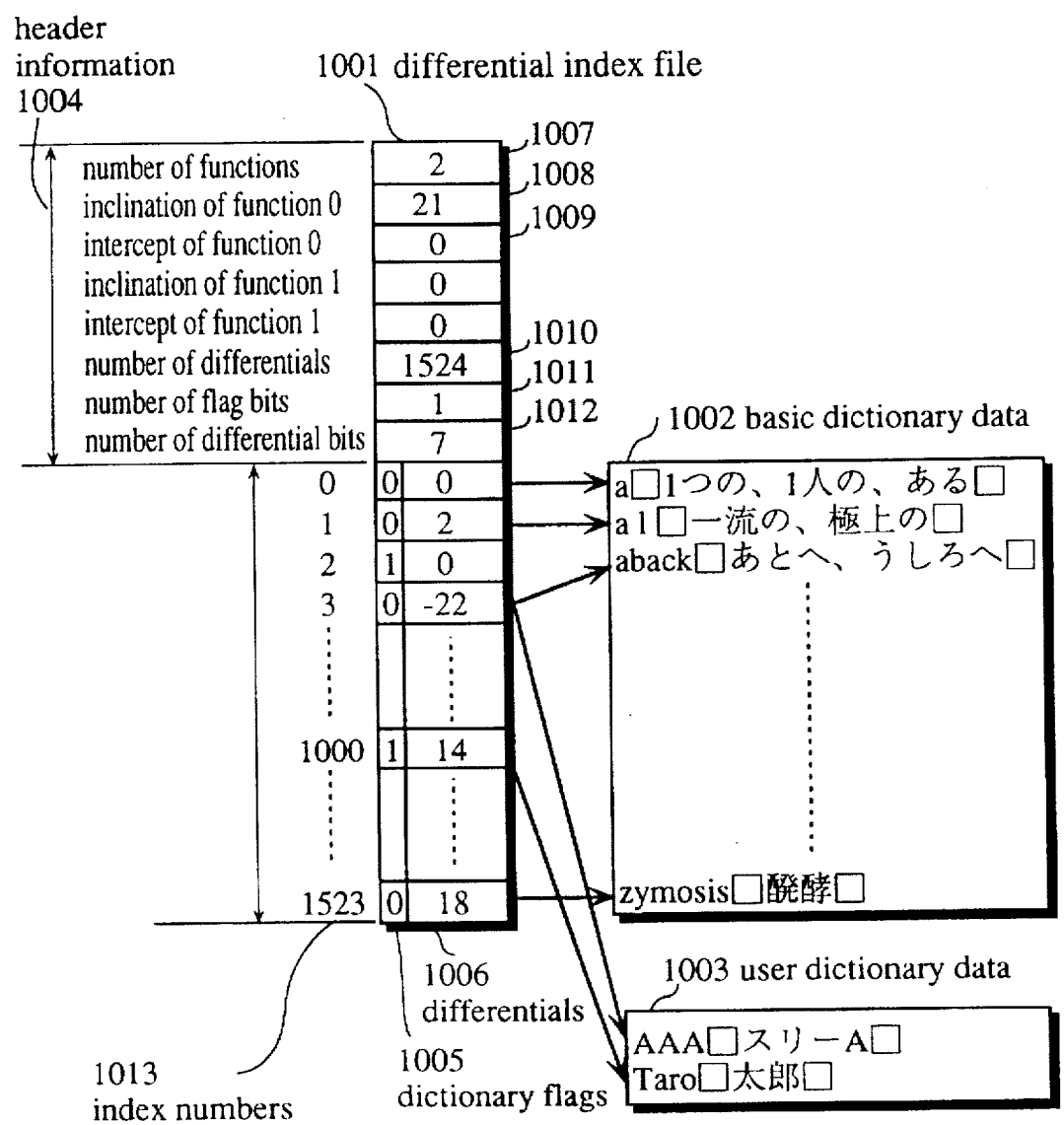
FIG. 11 shows an example of an electronic dictionary of the present embodiment.

FIG. 11 shows contents of an electronic dictionary including differential index file 1001. In differential index file 1001, capacity of each pointer is compressed into one byte by the index file compression device of the present embodiment. This is an English-Japanese dictionary comprising basic dictionary data 1002, user dictionary data 1003, and differential index file 1001 which shows storage positions of data elements of both data.

Differential index file 1001 comprises header information 1004 and a set of pointers, each of which are composed of dictionary flag 1005 corresponding to each data element and differential 1006.

Header information 1004 includes function number 100Y which shows a number of prediction functions which predict pointers of data elements, inclination 1008 and intercept 1009 when the prediction function is a linear function, differential number 1010 which shows a number of data elements, flag bit number 1011 which shows a bit number of dictionary flag 1005, and differential bit number 1012 which is a bit number of differential 1006. Each information is expressed in two bytes.

Each pointer is composed of a dictionary flag of one bit and a differential of seven bits. In FIG. 11, figures on the left side of each pointer represent index numbers 1013.

When this electronic dictionary is used with a special device, header 1004 can be installed in a program in the special device, so it is not necessary to store it in the differential index file of the electronic dictionary.

Moreover, when there is only one type of dictionary data, dictionary flag 1005 is not needed.

Figure 12:
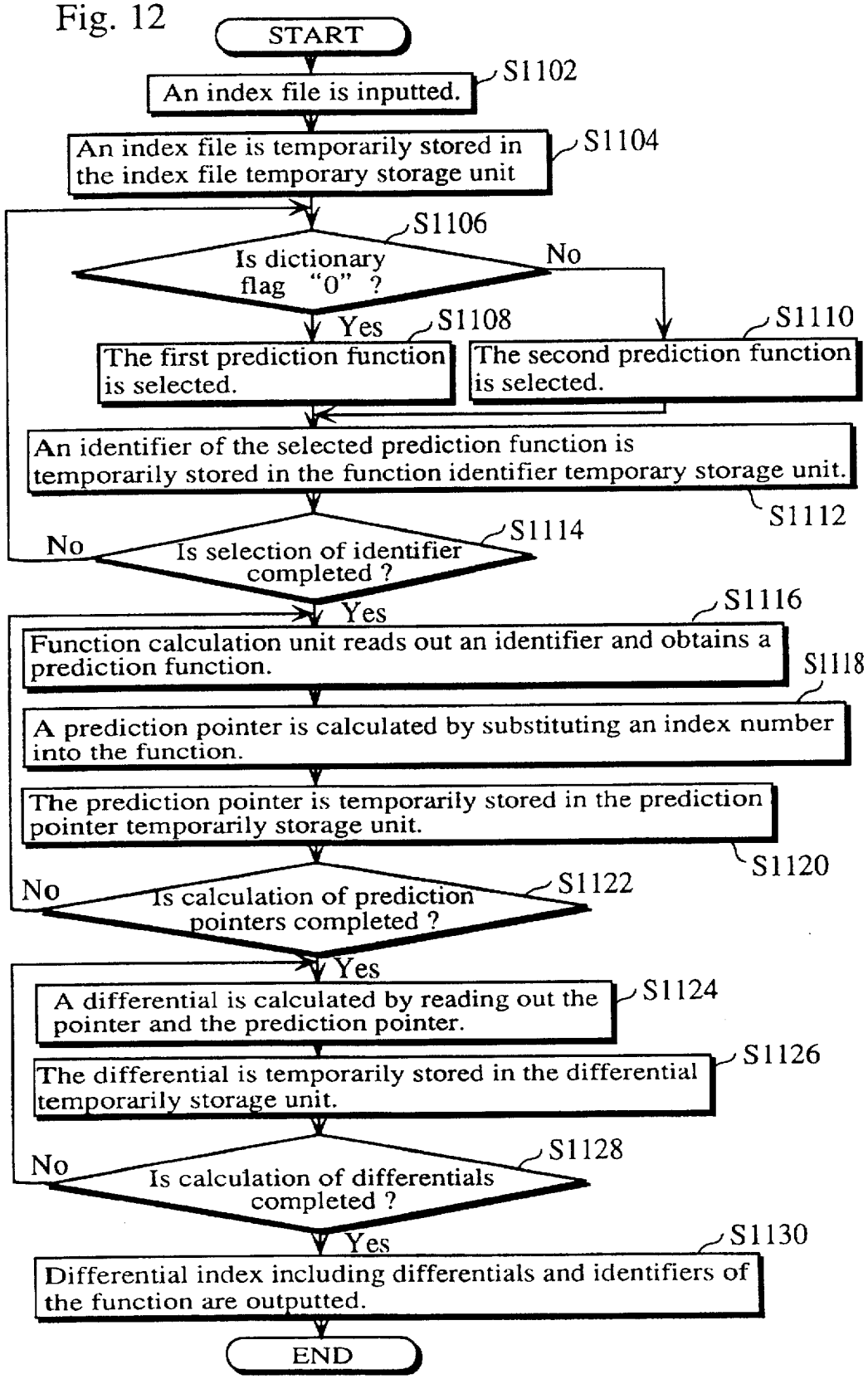
FIG. 12 shows a flowchart for operations of the present embodiment.

Operations of the present embodiment can be explained as follows by means of a flowchart in FIG. 12.

Index file is inputted into input unit 101 (Step 1102), and temporarily stored in index file temporary storage unit 102 (Step 1104).

Function selection unit 104 determines whether a dictionary flag of each pointer in index file temporarily stored in index file temporary storage unit 102 is "0" or "1" (Step 1106), selects the first prediction function when "0" (Step 1108), selects the second prediction function when "1" (Step 1110), and makes function identifier temporary storage unit 105 temporarily store a corresponding identifier (Step 1112). It is determined whether identifiers corresponding to all pointers are stored in function identifier temporary storage unit 105 (Step 1114). If they are stored, Step 1116 starts. If that is not the case, Step 1106 starts again. Function calculation unit 106 reads out an identifier temporarily stored in function identifier temporary storage unit 105, and obtains a prediction function from prediction function storage unit 103 (Step 1116). A prediction pointer is calculated by substituting an index number corresponding to the pointer temporarily stored in index file temporary storage unit 102 into the obtained function (Step 1118). The prediction pointer is temporarily stored in prediction pointer temporary storage unit 107 (Step 1120). It is determined whether all prediction pointers are calculated (Step 1122). If they are calculated, Step 1124 starts. If that is not the case, Step 1116 starts again. Differential calculation unit 108 calculates a differential between a pointer temporarily stored in index file temporary storage unit 102 and a prediction pointer temporarily stored in prediction pointer temporary storage unit 107 (Step 1124), and makes differential temporary storage unit 109 temporarily store the differential (Step 1126).

Lastly, output unit 110 outputs differential index file 903, which is a pair of a differential temporarily stored in differential temporary storage unit 109 and an identifier of its corresponding function temporarily stored in function identifier temporary storage unit 105 (Step 1130), and completes processing.

Prediction function storage 103 of the present embodiment stores a linear function and a constant function. But it can also store a quadratic function, a exponential function, and a function including rounding up and down fraction according to a pointer in an index file to be compressed.

Differential calculation unit 108 of the present embodiment subtracts a prediction pointer from a pointer. But it can subtract a pointer from a prediction pointer.

In the present embodiment, compression of an index file of an English-Japanese dictionary including two types of data is explained. The compression can also be applied to an index file of an English-Japanese dictionary including three types of data or more, or index files of a Japanese dictionary, address book, data base and so on.

(Second Embodiment)

Figure 13:
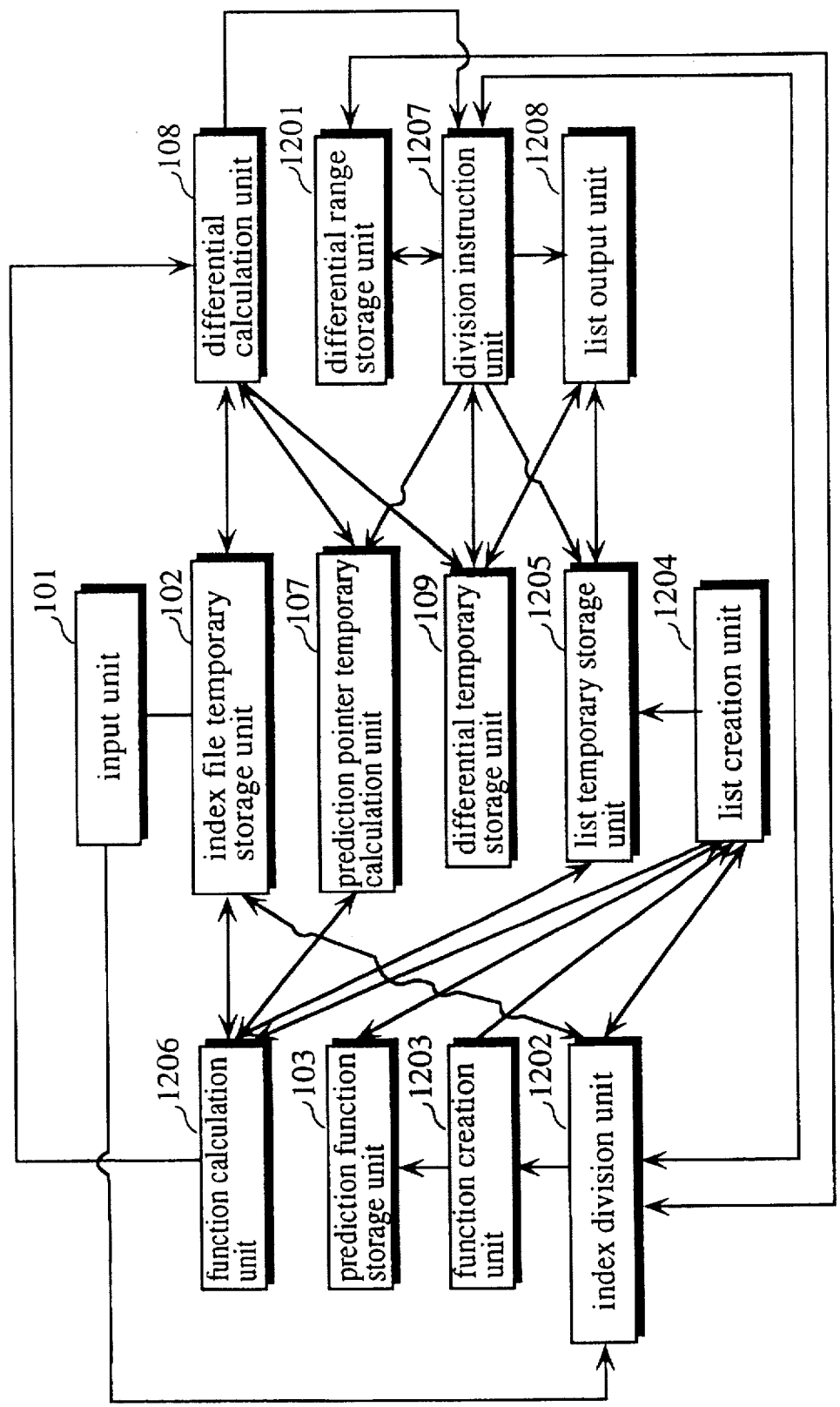
FIG. 13 shows configuration of an index compression device of the second embodiment of the present invention.

FIG. 13 shows configuration of the index compression device of the second embodiment of the present invention.

The index file compression device comprises input unit 101, index file temporary storage unit 102, differential range storage unit 1201, index division unit 1202, prediction function storage unit 103, function creation unit 1203, list creation unit 1204, list temporary storage unit 1205, function calculation unit 1206, prediction pointer temporary storage unit 107, differential calculation unit 108, differential temporary storage unit 109, division instruction unit 1207, and list output unit 1208. The following explanation will touch on only the differences with the first embodiment; A unit having the same configuration is just given the same reference number.

Figure 14:
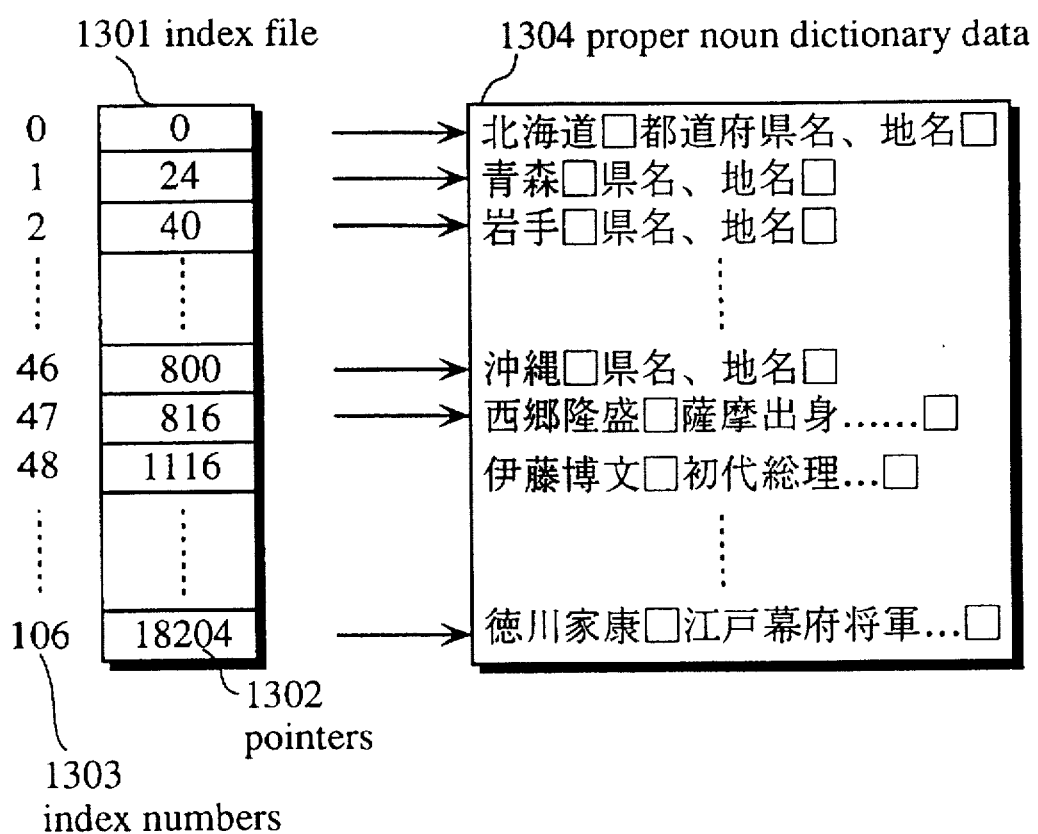
FIG. 14 shows an example of an index file to be compressed and a proper noun dictionary of the present embodiment.

On being inputted index file 1301 as shown in FIG. 14, input unit 101 makes index file temporary storage unit 102 temporarily store index file 1301 and activates index division unit 1202. FIG. 14 shows index file 1301 and proper noun dictionary data 1304 whose data elements can be located by each of pointers 1302.

Index file 1301 stores pointers 1302, each of which shows a storage position of a data element in proper noun dictionary data 1304. Index numbers 1303 are given to pointers 1302. Proper noun dictionary data 1304 includes data elements whose storage positions are shown by pointers 1302.

In FIG. 14, the pointer having index number "2" is "40". It means the data element is stored at the 40th byte in proper noun dictionary data 1304.

FIG. 15 shows index file 1401, which is index file 1301 expressed in binary notation. Such a form is stored in magnetic discs and the like. Each pointer is expressed in two bytes. Pointers in index file 1401 are expressed in hexadecimal notation.

Figure 16:
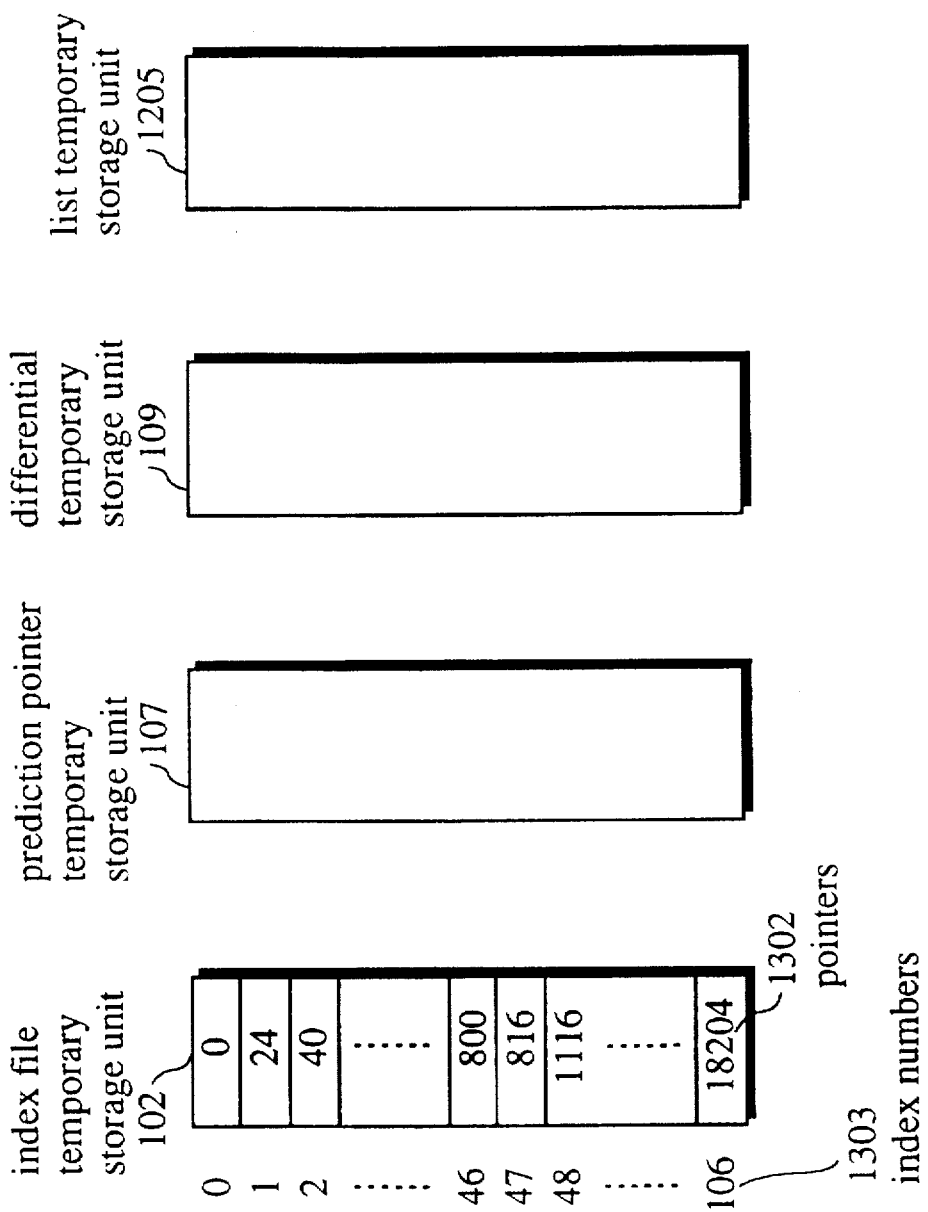
FIG. 16 shows contents of each temporary storage unit in the present embodiment.

However, each pointer is expressed on one byte in the present embodiment. FIG. 16 shows state of index file temporary storage unit 102, prediction pointer temporary storage unit 107, differential temporary storage unit 109, list temporary storage unit 1205 right after index file 1301 is inputted.

Figure 17:
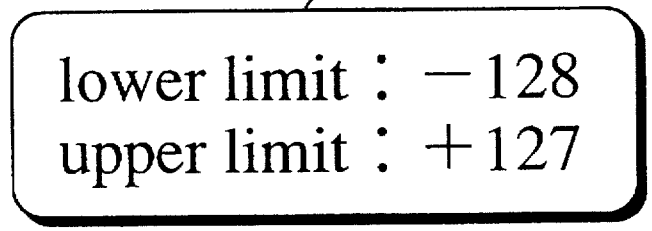
FIG. 17 shows contents of a differential range storage unit of the present embodiment.

Differential range storage unit 1201 stores upper and lower limits of differential temporarily stored in differential temporary storage unit 109, which is shown in FIG. 17. Specific examples of differential range storage unit 1201 are a magnetic disc and a high-speed semiconductor memory. The upper and lower limits are set to "+127" and "−128", as differentials are expressed in eight bits.

Index division unit 1202 divides an index file temporarily stored in index file temporary storage unit 102 into blocks. On being activated by input unit 101, index division unit 1202 does not divide an index file at all, obtains the final index number from index file temporary storage unit 102 and posts it to function creation unit 1203. On receiving an instruction from division instruction unit 1207, index division unit 1202 reads out pointers 1302 from the beginning, calculates increments between neighboring pointers 1302, and further calculates increments of the neighboring increments (difference of second order of pointers 1302). When calculation for the last of pointers 1302 is completed, index division unit 1202 posts index numbers corresponding to the values beyond the range stored in differential range storage unit 1201.

Function creation unit 1203 recognizes the posted index number as the last of a block. When there are subsequent index numbers after the posted index number, function creation unit 1203 recognizes the next index number as a beginning of the next block. Function creation unit 1203 creates prediction functions to predict pointers 1302 in each block, makes prediction function storage unit 103 store the prediction function, and activates list creation unit 1204.

Figure 18:
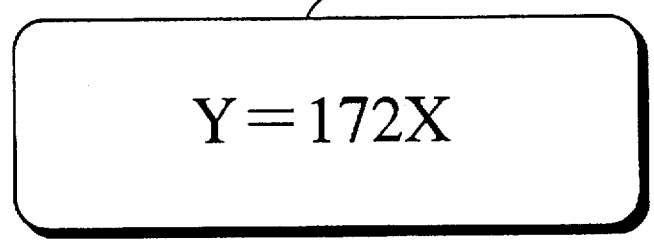
FIG. 18 shows contents of a prediction function storage unit of the present embodiment.

For example, on receiving "106" of index numbers 1303 from index division unit 1202, function creation unit 1203 reads out "18204" from index file temporary storage unit 102. Then, function creation unit 1203 divides "18204" by "106", counts fractions of 0.5 and over as a whole number and disregards the rest, thereby obtaining "172". Function creation unit 1203 obtains prediction function Y=172X and makes prediction function storage unit 103 store it as shown in FIG. 18.

On receiving one or a plurality of index numbers 1303 from index division unit 1202, function creation unit 1203 divides the index file, index numbers 1303 posted from index division unit 1202 being the last of each block. Function creation unit 1203 creates prediction functions for predicting pointers 1302 in each block. Function creation unit 1203 updates contents of prediction function storage unit 103.

Figure 19:
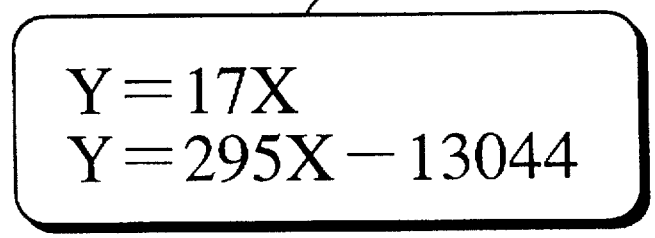
FIG. 19 shows contents of a prediction function storage unit of the present embodiment.

For example, on receiving "47" of index numbers 1303 from index division unit 1202, function creation unit 1203 obtains a prediction function of a block from "0" to "47" and a block from "48" to "1062". Function creation unit 1203 reads out "816" from index file temporary storage unit 102, divides "816" by "47", counts fractions of 0.5 and over as a whole number and disregards the rest, thereby obtaining "17". Function creation unit 1203 obtains prediction function Y=17X for a block from "0" to "47". Next, function creation unit 1203 reads out "1116" from index file temporary storage unit 102, calculates (18204−1116)/(106−48) counting fractions of 0.5 and over as a whole number and disregarding the rest, thereby obtaining "295" as an inclination of a linear function. Function creation unit 1203 obtains a prediction function Y=295X−13044 for a block from "48" to "106", and makes prediction function storage unit 103 store it as shown in FIG. 19.

On being activated by function creation unit 1203, list creation unit 1204 creates a list of each block divided by index division unit 1202 and a function stored in prediction function storage unit 103, makes list temporary storage unit 1205 temporarily store the list.

Figure 20:
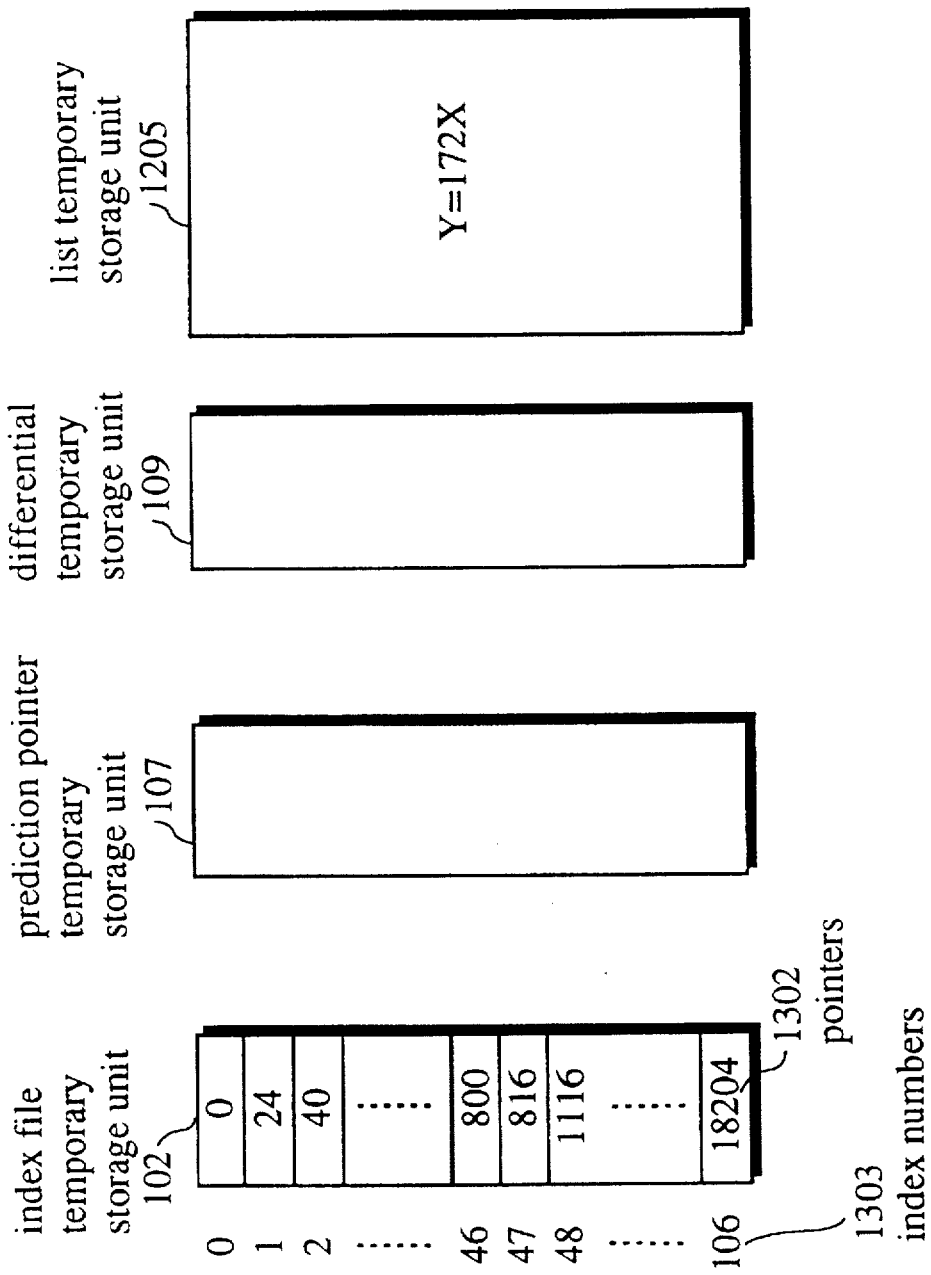
FIG. 20 shows contents of each temporary storage unit of the present embodiment.

When a list creation unit 1204 is activated by function creation unit 1203 for the first time, there is only one block and its corresponding function is Y=172X. List creation unit 1204 makes list temporary storage unit 1205 temporarily store this block and function, activating function calculation unit 1206. FIG. 20 shows state of index file temporary storage unit 102, prediction pointer temporary storage unit 107, differential temporary storage unit 109, and list temporary storage unit 1205 at this stage.

Figure 21:
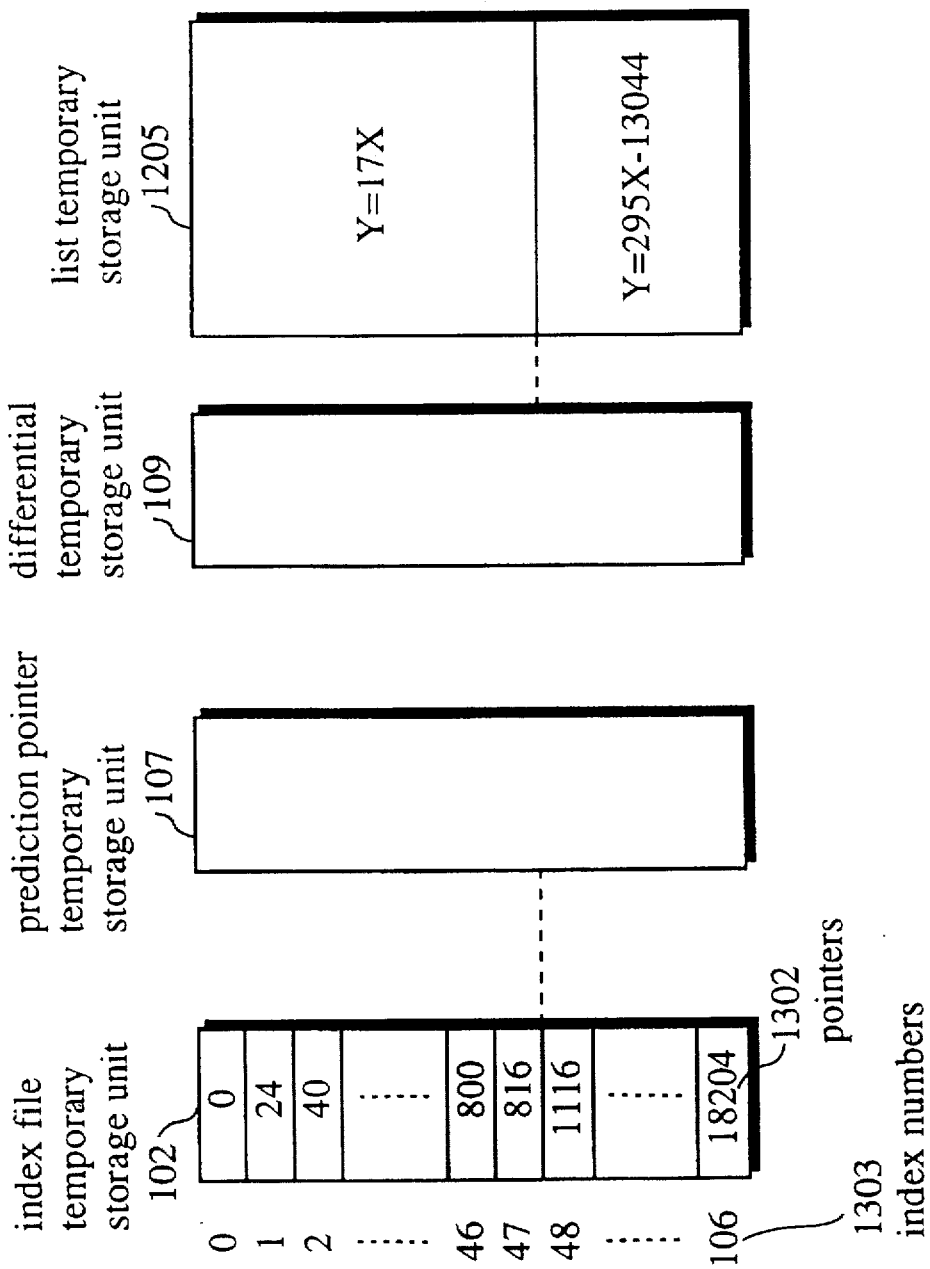
FIG. 21 shows contents of each temporary storage unit of the present embodiment.

On being activated by function creation unit 1203 again, list creation unit 1204 creates a list of each block divided by index division unit 1202 and functions newly stored in prediction function storage unit 103, and makes list temporary storage unit 1208 temporarily store the list. There are two blocks and each of their function is Y=17X and Y=295−13044. List creation unit 1204 makes list temporary storage unit 1205 temporarily store this list and activates function calculation unit 1206. FIG. 21 shows state of index file temporary storage unit 102, prediction pointer temporary storage unit 107, differential temporary storage unit 109, and list temporary storage unit 1205 at this state.

Specific examples of list temporary storage unit are a high-speed semiconductor memory and the like. FIGS. 20 and 21 are examples of lists created by list creation unit 1204: In FIG. 20, Y=172X is applied to the index file which is not divided into blocks; In FIG. 21, Y=17X is applied to a block from "0" to "47" and Y=295X−13044 to a block from "48" to "106".

On being activated by list creation unit 1204, function calculation unit 1206 reads out the prediction function temporarily stored in list temporary storage unit 1205, and substitutes index number 1303 which corresponds to the function into input variable X, thereby calculating output variables Y which is a prediction pointer, and makes prediction pointer temporary storage unit 107 temporarily store it. When calculation of prediction pointers is completed, function calculation unit 1206 activates differential calculation unit 108.

Figure 22:
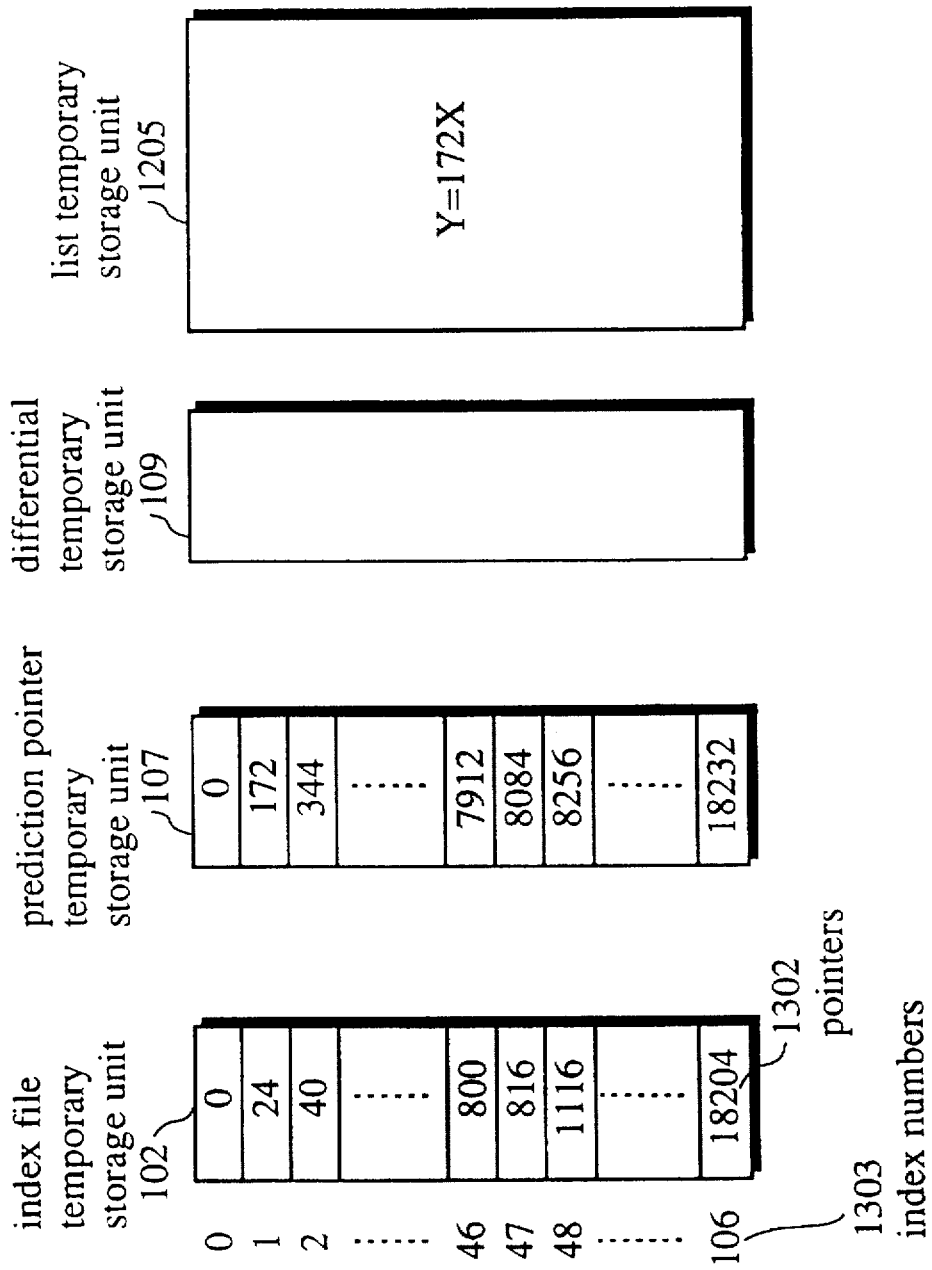
FIG. 22 shows contents of each temporary storage unit of the present embodiment.

When pointers 1302 are temporarily stored in index file temporary storage unit 102 and Y=172X is temporarily stored in list temporary storage unit 1205 as shown in FIG. 20, function calculation unit 1206 calculates prediction pointers successively, and makes prediction pointer temporary storage unit 107 temporarily store them. FIG. 22 shows the result.

Figure 23:
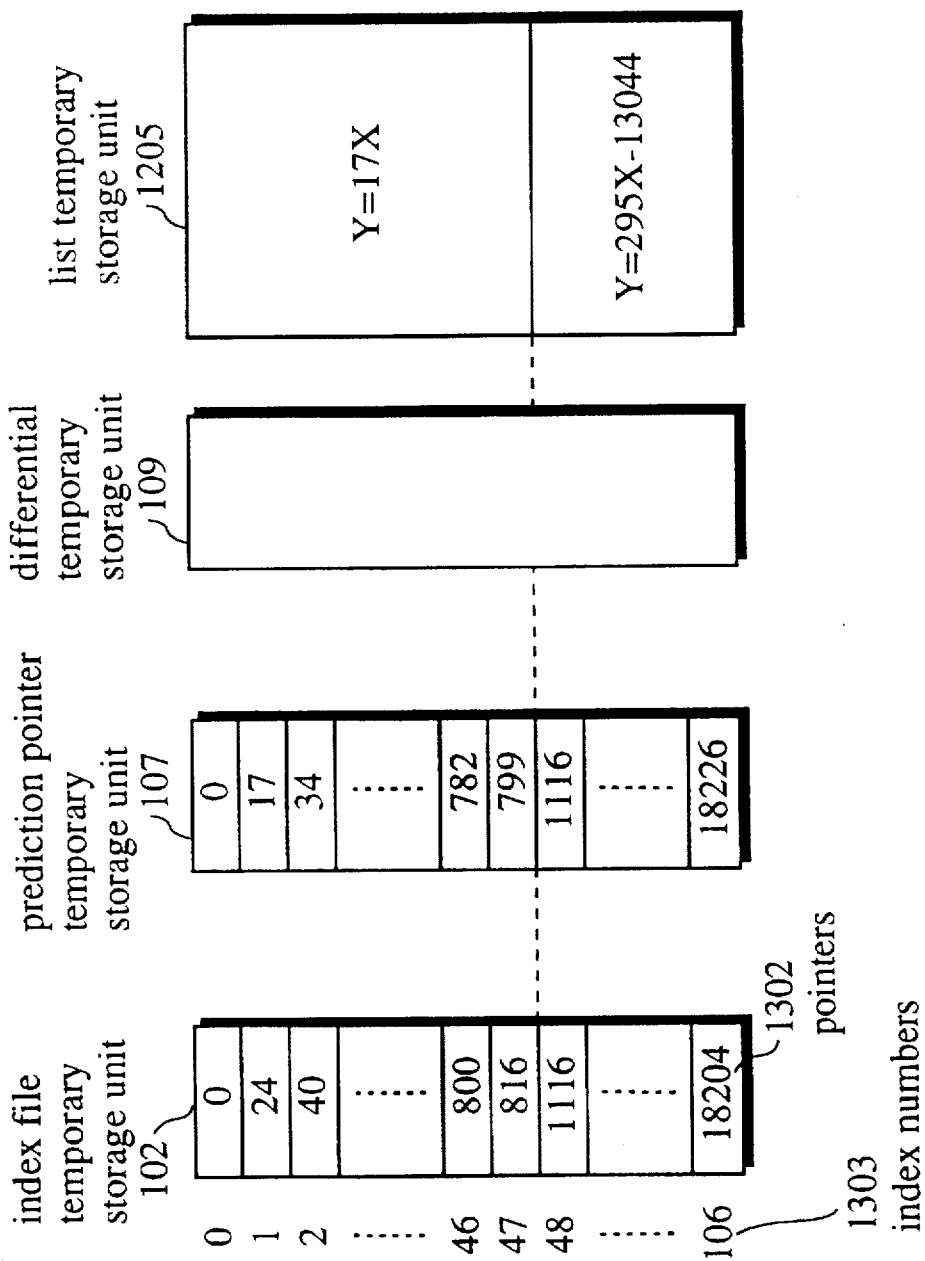
FIG. 23 shows contents of each temporary storage unit of the present embodiment.

When Y=17X for a block from "0" to "47" and Y=295X−13044 for a block from "48" to "106" are temporarily stored in list temporary storage unit 1205 as shown in FIG. 21, function calculation unit 1206 calculates prediction pointers using Y=17X for the former block and Y=295X−13044 for the latter block, and makes prediction pointer temporary storage unit 107 temporarily store them. FIG. 23 shows the result.

When differential calculation unit 108 completes calculating differentials of pointers temporarily stored in index file temporary storage unit 102 and predication pointers temporarily stored in prediction pointer temporary storage unit 107, it activates division instruction unit 1207.

Figure 24:
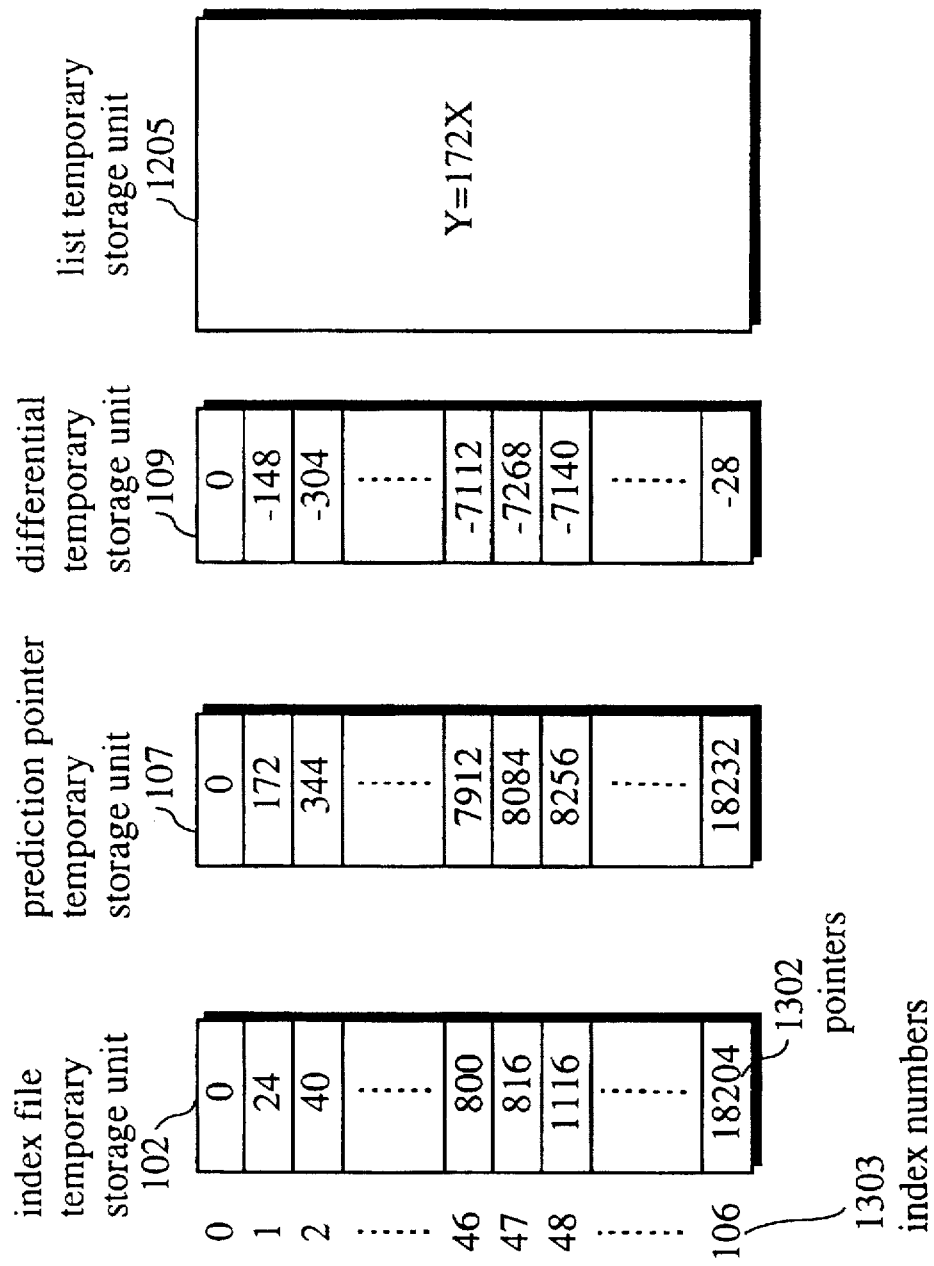
FIG. 24 shows contents of each temporary storage unit of the present embodiment.
Figure 25:
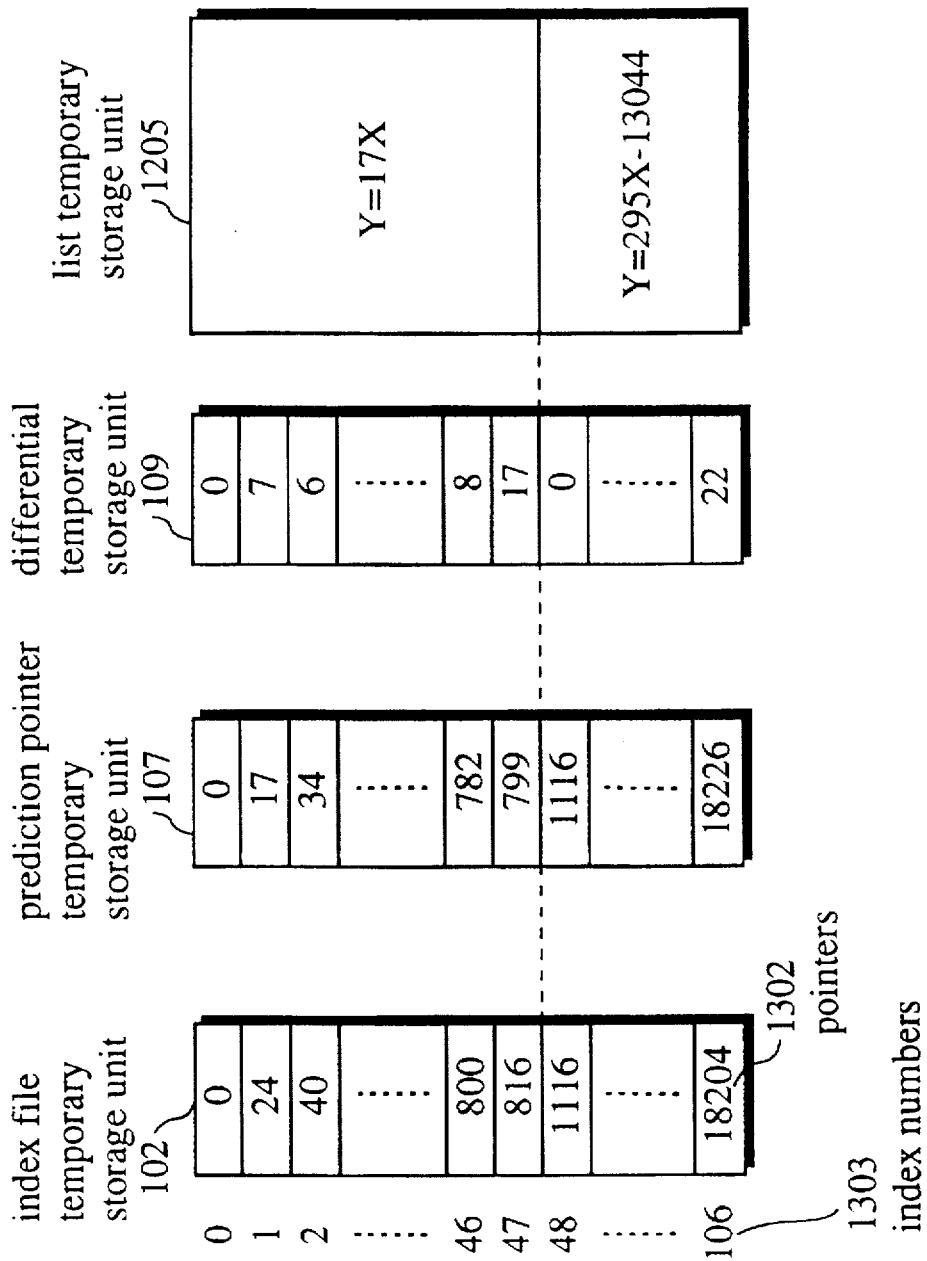
FIG. 25 shows contents of each temporary storage unit of the present embodiment.

Differential temporary calculation unit 109 temporarily stores differentials calculated by differential calculation unit 108 as shown in FIGS. 24 and 25.

On being activated by differential calculation unit 108, division instruction unit 1207 reads out the upper and lower limits of the differentials stored in differential range storage unit 1201 and determines whether all differentials temporarily stored in differential temporary storage unit 109 are within the range of the lower and upper limits. If differentials in differential temporary storage unit 109 are within this range, division instruction unit 1207 activates list output unit 1208. When that is not the case, division instruction unit 1207 deletes contents of prediction pointer temporary storage unit 107, differential temporary storage unit 109 and list temporary storage unit 1205, activating index division unit 1202.

Division instruction unit 1207, when differentials are temporarily stored in differential temporary storage unit as shown in FIG. 24, determines that they are beyond the range of "−128" to "127". In such a case, division instruction unit 1207 activates index division unit 1202 so as to create a new prediction function, dividing index file.

Division instruction unit 1207, when differentials are temporarily stored in differential temporary storage unit as shown in FIG. 25, determines that they are within the range of "−128" to "127". In such a case, all differentials stored in differential temporary storage unit 109 can be expressed in eight bits.

Figures 26, 27:
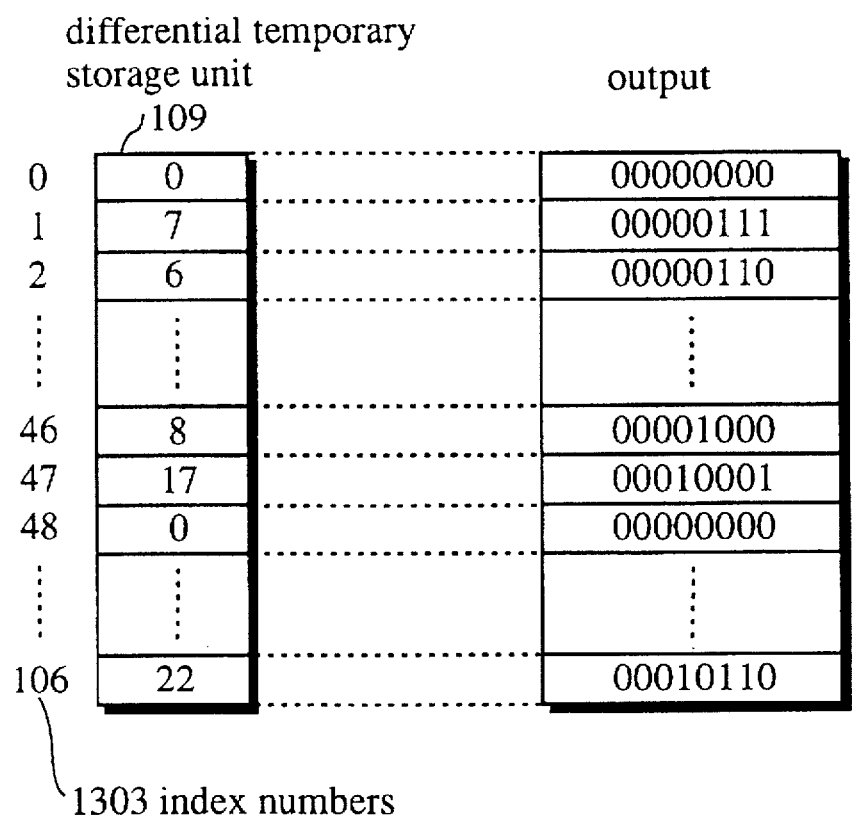
FIG. 26 shows contents of a differential temporary storage unit and a differential index file to be outputted in the present embodiment.
FIG. 27 shows a list to be outputted in the present embodiment.

On being activated by division instruction unit 1207, list output unit 1208 reads out differentials temporarily stored in differential temporary storage unit 109 and a list stored in list temporary storage unit 1205, and outputs them to a storage unit which stores a differential index file (not illustrated). Differentials temporarily stored in differential temporary storage unit 109 are expressed in binary notation and outputted as shown in FIG. 26. A list composed of the first and the last index numbers of each block and their corresponding prediction functions are outputted as shown in FIG. 27. Moreover, a prediction function can be outputted as it is, but if it is a linear function, only inclination value and intercept value can be outputted. Differentials can be stored in a CD-ROM as differential index file along with dictionary data, and the list can be stored as a program of a regeneration device of the CD-ROM.

Figure 28:
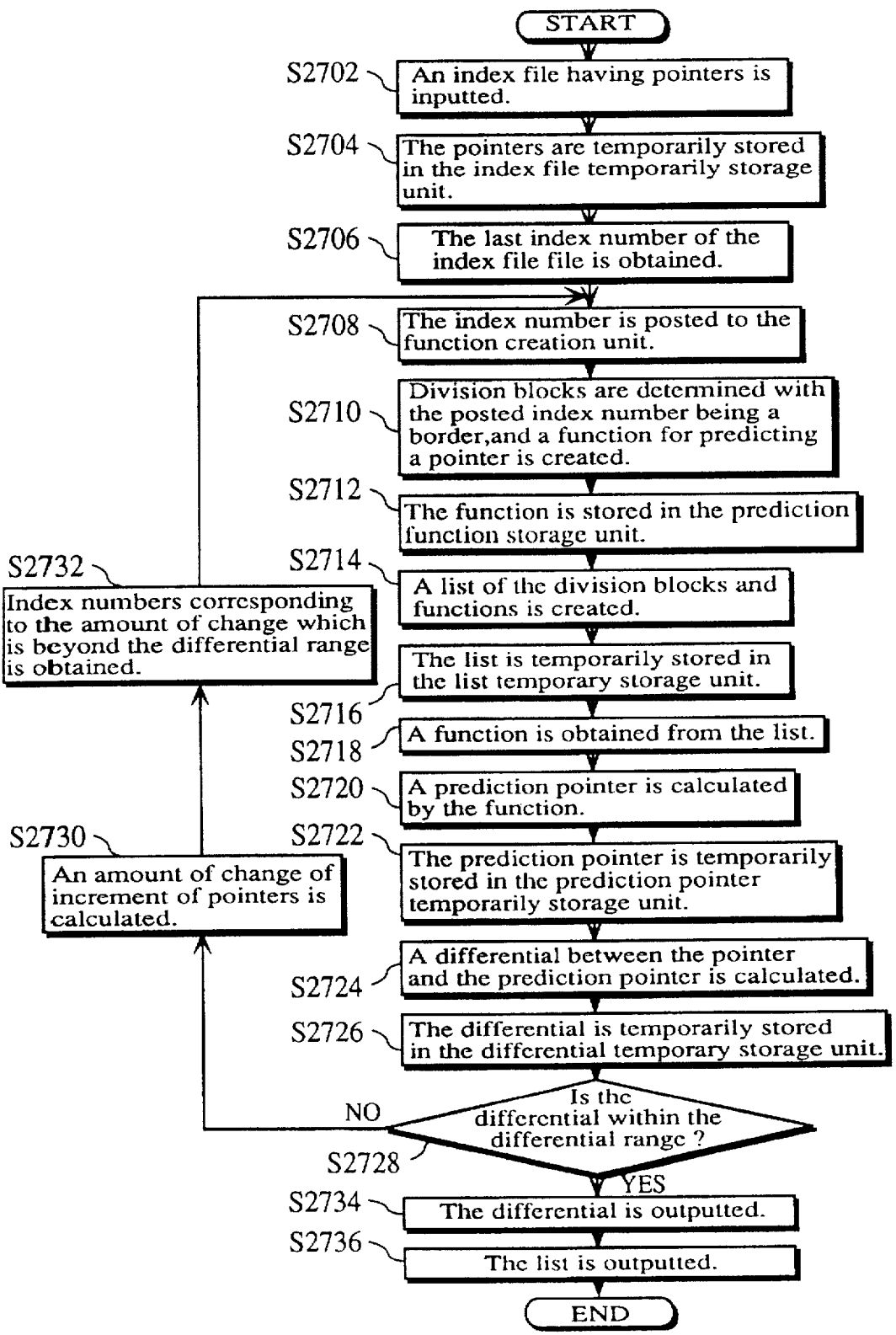
FIG. 28 shows a flowchart for operations of the present embodiment.

Operations of the present embodiment can be explained as follows by means of a flowchart in FIG. 28.

When an index file having pointers 1302 is inputted in input unit 101 (Step 2702), input unit 101 makes index file temporary storage unit 102 successively store pointers 1302 in order of index numbers 1303 (Step 2704). Index division unit 1202 obtains the last index number of the index file (Step 2706) and posts it to function creation unit 1203 (Step 2708)

Function creation unit 1203 divides the index file into blocks, with the posted index number being the last of a block, creates a prediction function for prediction pointers (Step 2710), and makes prediction function storage unit 103 store the prediction function (Step 2712).

List creation unit 1204 creates a list of divided blocks and prediction functions (Step 2714), and makes list temporary storage unit 1205 temporarily store the list (Step 2716).

Function calculation unit 1206 obtains the prediction functions from list temporary storage unit 1205 (Step 2718), substitutes index numbers into the functions, thereby obtaining prediction pointers (Step 2720), and makes prediction pointer temporary storage unit 107 temporarily store them (Step 2722).

Differential calculation unit 108 calculates differentials of pointers temporarily stored in index file temporary storage unit 102 and predication pointers temporarily stored in prediction pointer temporary storage unit (Step 2724) and makes differential temporary storage unit 109 temporarily store them (Step 2726).

Division instruction unit 1207 determines whether differentials in differential temporary storage unit 109 are within the range of upper and lower limits stored in differential range storage unit 1201 (Step 2728).

When they are not within the range, index division unit 1202 calculates an amount of change of increments of pointers temporarily stored in index file temporary storage unit 102 (Step 2730), obtains index numbers corresponding to values beyond the differential range stored in differential range storage unit 1201 (Step 2732), and Step 2708 starts.

When they are within the range, list output unit 1208 reads out and outputs differentials stored in differential temporary storage unit 109 (Step 2734), and a list stored in list temporary storage unit 1205 (Step 2736), and completes processing.

(Third Embodiment)

Figure 29:
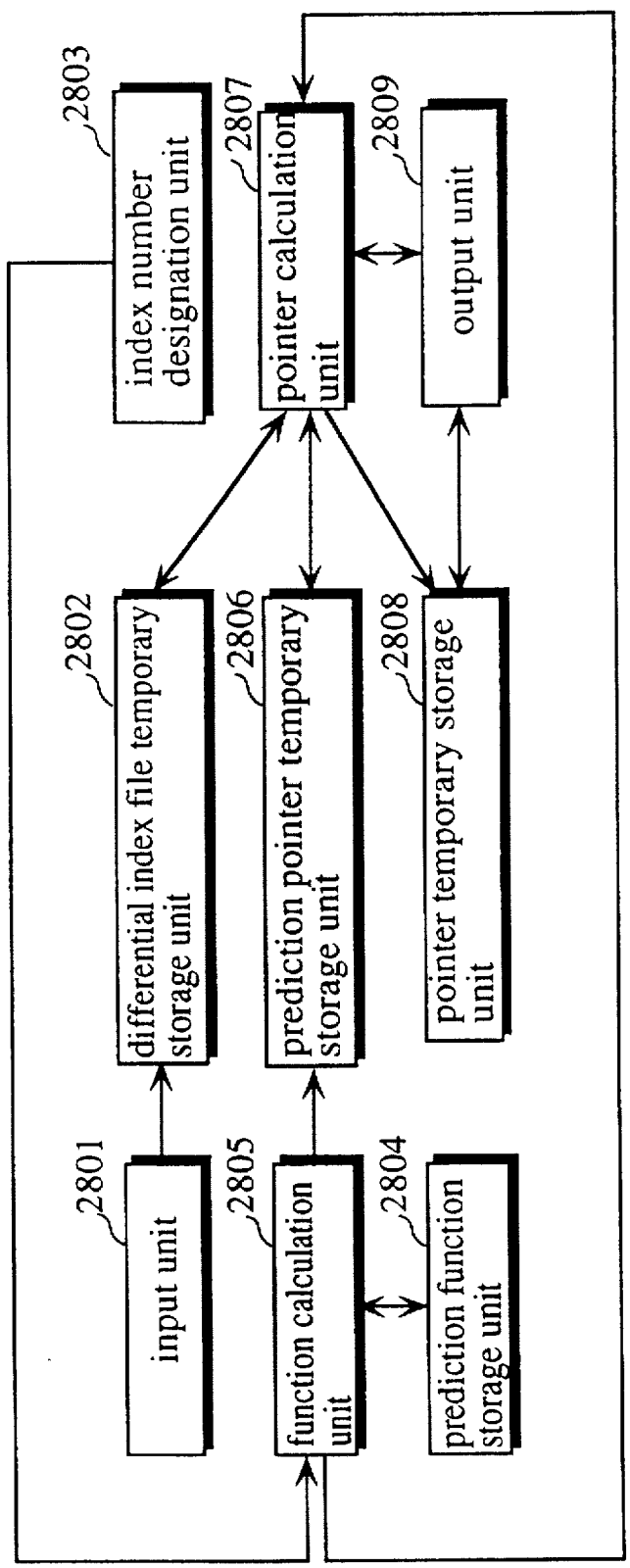
FIG. 29 shows configuration of an index decompression device of the third embodiment of the present invention.

FIG. 29 shows configuration of the index decompression device of the third embodiment of the present invention.

The index decompression device comprises input unit 2801 for inputting a differential index file, differential index file temporary storage unit 2802 composed of a high-speed semiconductor memory and the like, index number designation unit 2803 for retrieving data elements, prediction function storage unit 2804, function calculation unit 2805 for calculating prediction pointers, prediction pointer temporary storage unit 2806 composed of a high-speed semiconductor memory and the like, pointer calculation unit 2807, pointer temporary storage unit 2808 composed of a high-speed semiconductor memory and the like, and output unit 2809.

Input unit 2801 reads differential index file 2901 of an electronic English-Japanese dictionary shown in FIG. 30, makes differential index file temporary storage unit 2802 store it, and activates function calculation unit 2805.

Here, the electronic English-Japanese dictionary in FIG. 30 has binary differential index file 2901 and English-Japanese dictionary data 2902. Binary differential index file 901 is an equivalent of differential index file 2903 expressed in decimal notation. Index numbers 2905 are given to all items of differential index 2904. All items of differential index 2904 are restored to pointers 2906 according to a given procedure. Each of pointers 2906 shows a storage position of each data element in English-Japanese dictionary data 2902, as shown by arrow 2907.

Figure 31:
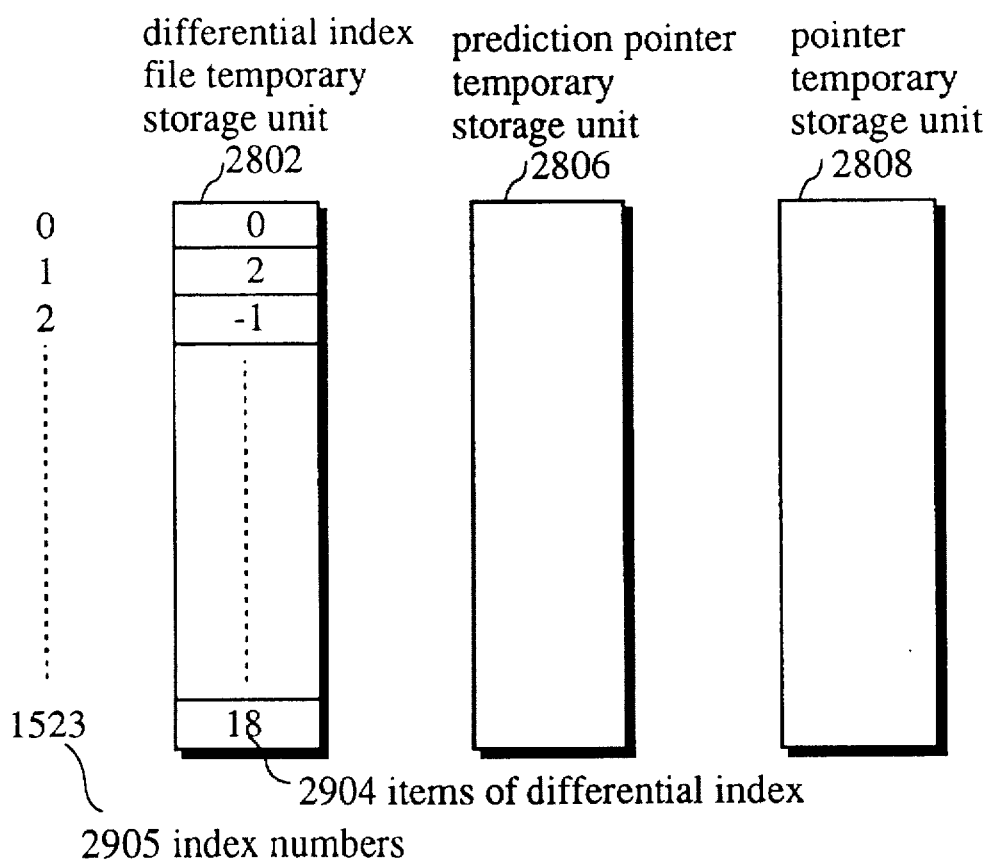
FIG. 31 shows contents in each temporary storage unit of the present embodiment.

FIG. 31 shows a state of differential index file temporary storage unit 2802, prediction pointer temporary storage unit 2806, and pointer temporary storage unit 2808 right after differential index file 2901 is inputted. Each item of differential index 2904 is stored in differential index file temporary storage unit 2802.

Index number designation unit 2803 posts, when index number 2905 is designated so as to restore an item of differential index file 2904 to pointer 2906, the designated index number 2905 to function calculation unit 2805.

Figure 32:
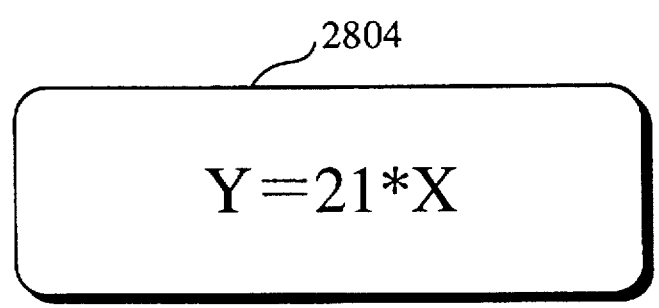
FIG. 32 shows contents of a prediction function storage unit of the present embodiment.

Prediction function storage unit 2804 has already stored a prediction function for predicting pointers 2906 corresponding to each of differential index 2904, as is shown in FIG. 32. Output variable Y as a prediction pointer can be calculated by substituting index number 2905 for input variable X in prediction function Y=21X. This prediction function corresponds to the prediction functions used in the index compression device of the first and second embodiments.

On receiving index number 2905 from index number designation unit 2803, function calculation unit 2805 calculates a prediction pointer by reading out a prediction function stored in prediction function storage unit 2804 and substituting the posted index number 2905 into the prediction function. Function calculation unit 2805 makes prediction pointer temporary storage unit 2806 temporarily store the calculated prediction pointer and posts the index number to pointer calculation unit 2807. For example, on being posted "2" of index number 2905 from index number designation unit 2803, function calculation unit 2805 reads out Y=21X from prediction function storage unit 2804, calculates Y=21*2 =42, and makes prediction pointer temporary storage unit 2806 store "42".

Figure 33:
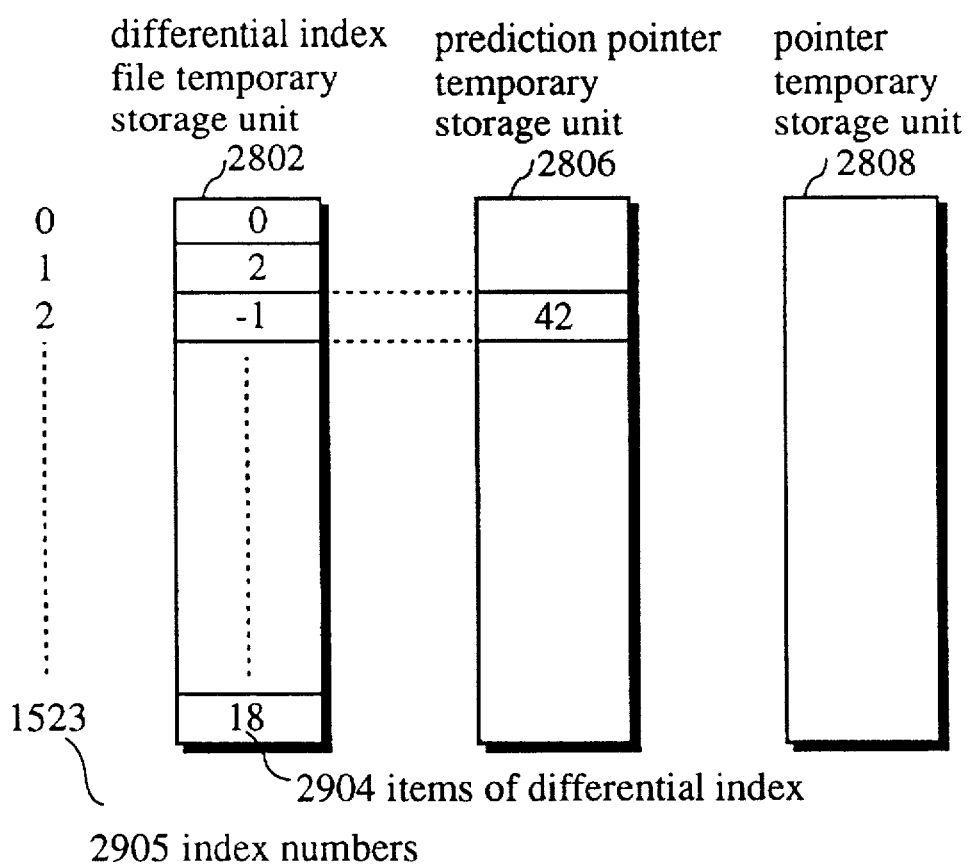
FIG. 33 shows contents of each temporary storage unit of the present embodiment.

Prediction pointer temporary storage unit 2806 stores prediction pointers calculated by function calculation unit 2805 as shown in FIG. 33, each of prediction pointers corresponding to each of index numbers 2905.

On receiving index number 2905 from function calculation unit 2805, pointer calculation unit 2807 adds a differential index corresponding to the posted index number 2905 stored in differential index file temporary storage unit 2802 and a prediction pointer stored in prediction pointer temporary storage unit 2806, makes pointer temporary storage unit 2808 temporarily store the sum and activates output unit 2809. As shown in FIG. 33, if index number 2905 is "2", the differential index file is "-1" and the prediction pointer is "42". So the sum is "41".

Figure 34:
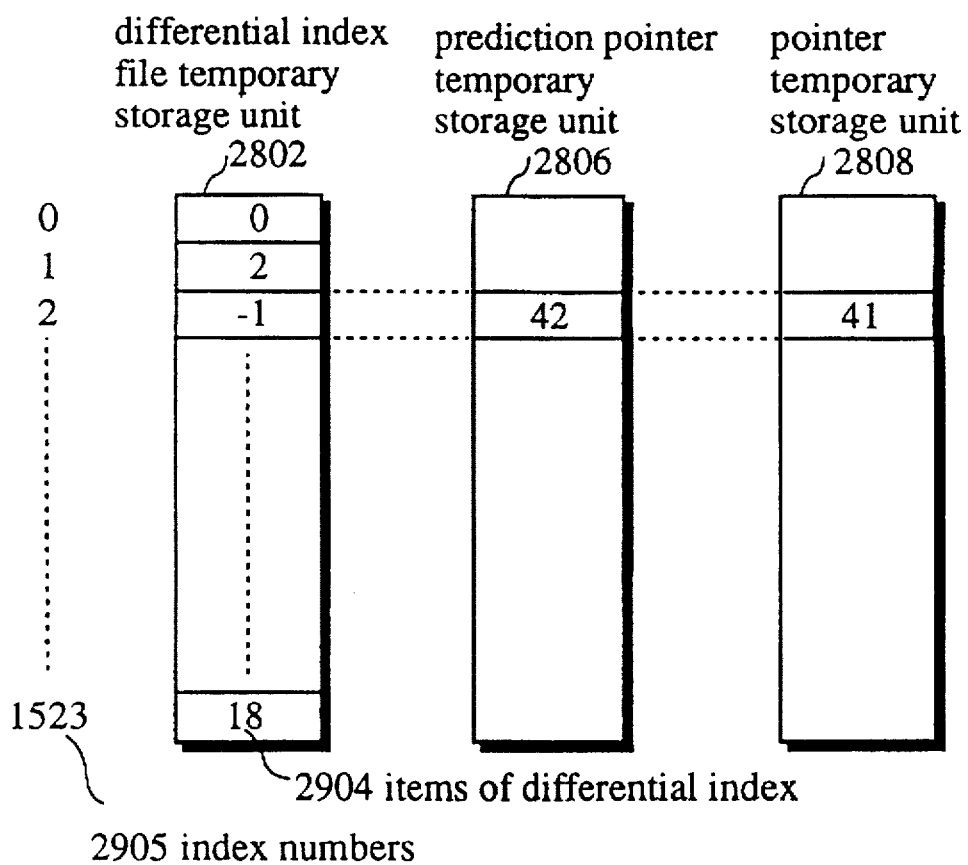
FIG. 34 shows contents of each temporary storage unit of the present embodiment.

Pointer temporary storage unit 2808 stores a pointer calculated by pointer calculation unit 2807 as shown in FIG. 34.

On being activated by pointer calculation unit 2807, output unit 2809 reads out a pointer stored in pointer temporary storage unit 2808, and outputs it to a dictionary retrieval unit (not illustrated).

Figure 35:
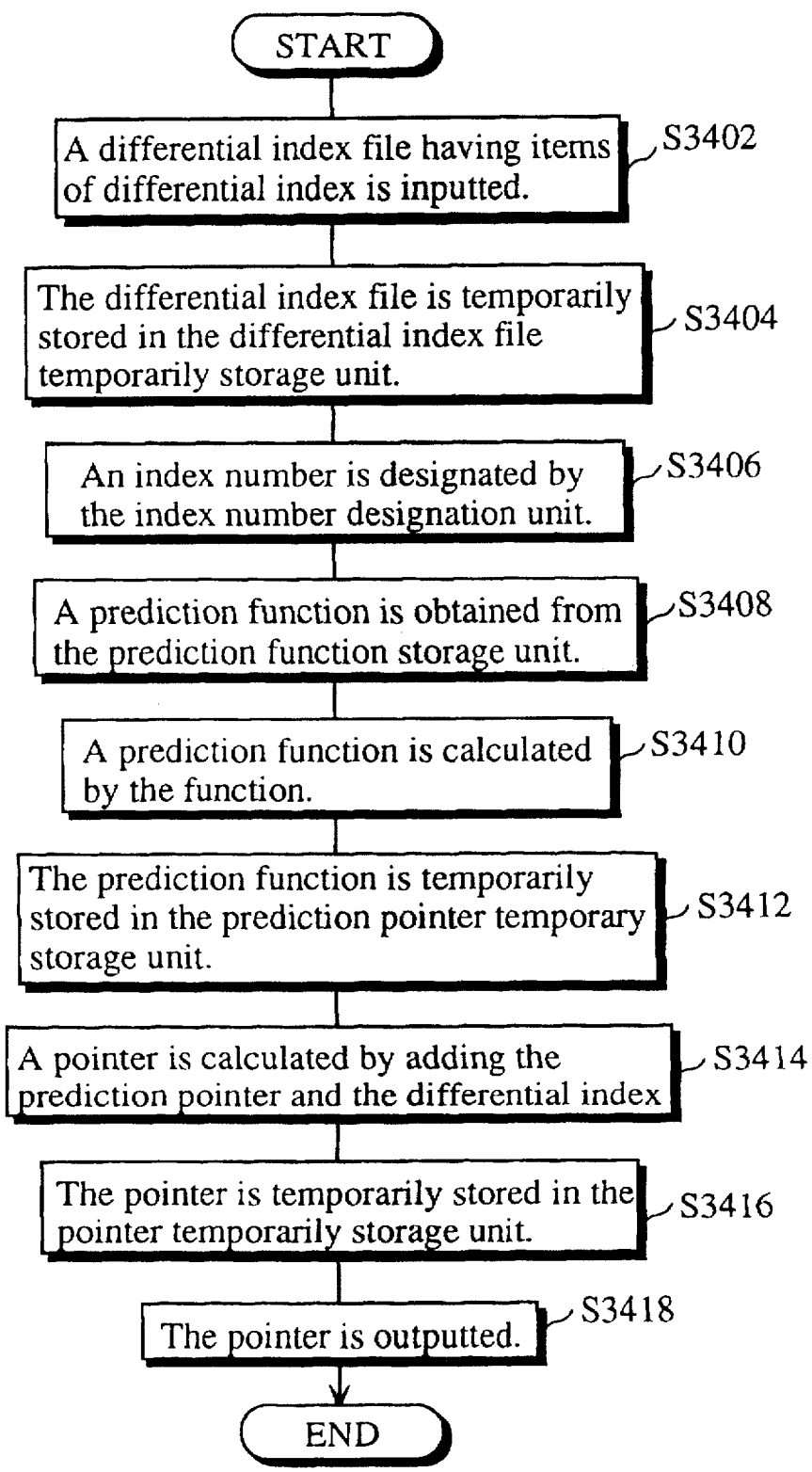
FIG. 35 shows a flowchart for operations of the present embodiment.

Operations of the present embodiment can be explained as follows by means of a flowchart in FIG. 35.

When differential index file 2903 having differential index 2904 is inputted in input unit 2801 (Step 3402), input unit 2801 makes differential index file temporary storage unit 2802 store it (Step 3404).

When index number designation unit 2803 designates an index number (Step 3406), function calculation unit 2805 obtains a prediction function from prediction function storage unit 2804 (Step 3408), calculates a prediction pointer by substituting the designated index number into the prediction function (Step 3410), and makes prediction pointer temporary storage unit 2806 store it (Step 3412).

Pointer calculation unit 2807 adds an item of differential index 2904 stored in differential index file temporary storage unit 2802 and a predication pointer stored in prediction pointer temporary storage unit 2806 (Step 3414), and makes pointer temporary storage unit 2808 store the sum.

Output unit 2809 reads out and outputs the pointer stored in pointer temporary storage unit 2808 (Step 3418)

In the present embodiment, prediction function storage unit 2804 has a prediction function stored beforehand. But, when differential index file 1001 has header information 1004, it is possible to set a prediction function creation unit which creates a prediction function based on the header information in stead of prediction function storage unit 2804.

In the present embodiment, prediction function storage unit 2804 stores one prediction function. But even if it stores a plurality of functions as is shown in FIG. 27 of the second embodiment, pointers can be restored as well.

Although the present invention has been fully described by way of examples width reference to the accompanying drawings, it is to be noted that various changes and modifications will be apparent to those skilled in the art. Therefore, unless such changes and modifications depart from the scope of the present invention, they should be construed as being included therein.

What is claimed is:

1. An electronic dictionary comprising:

a dictionary medium;

dictionary data composed of a plurality of dictionary data elements and stored in the dictionary medium; and an index file showing storage positions of all dictionary data elements and being stored in the dictionary medium, wherein the index file is a differential index in which each item is expressed by a differential between a pointer showing a storage position of a dictionary data element and a given function value, with each item of the differential index being expressed by a bit length equal to or shorter than maximum bit length for showing a storage position of a dictionary data element.

2. The electronic dictionary of claim 1 comprising different types of dictionary data stored in the dictionary data medium.

wherein the index file further includes function information for obtaining a given function value, and the differential index includes identifiers for identifying types of the dictionary data.

3. The electronic dictionary of claim 2, wherein a function shown by the function information is a linear function, and the function information includes a number of functions, an inclination and an intercept of each function, the number of function corresponding to a number of the identifiers.

4. An electronic dictionary comprising:

a dictionary medium;

dictionary data composed of a plurality of dictionary data elements and stored in the dictionary medium; and an index file showing storage positions of all dictionary data elements and being stored in the dictionary medium, wherein the index file is a differential index in which each item is expressed by a differential between a pointer showing a storage position of a dictionary data element and a given function value, with the given function value being obtained by substituting an index number into an approximation function for predicting a pointer.

5. A method of producing an electronic dictionary comprising:

a dictionary medium;

dictionary data composed of a plurality of dictionary data elements and stored in the dictionary medium; and an index file showing storage positions of all dictionary data elements and being stored in the dictionary medium, having the steps of:

dictionary data storing for storing dictionary data in an area in the dictionary medium;

function calculation for calculating a prediction pointer by substituting an index number into an already stored function for predicting a pointer;

differential calculation for calculating a differential between a pointer in an index file composed of pointers each showing a storage position of a dictionary data element in the dictionary medium and the prediction pointer calculated in the step of function calculation;

obtaining for obtaining the differential calculated in the step of differential calculation; and data storage for storing the differential obtained in the step of obtaining in an another area in the dictionary medium.

6. The method of producing the electronic dictionary of claim 5 further comprising, between the steps of dictionary data storing and function calculation, the step of;

function selection for selecting a function from a plurality of prediction functions in accordance with the pointer in the index file, wherein the step of function calculation includes the substep of calculating a prediction pointer using the function selected in the step of function selection, and the step of obtaining includes the sub-step of obtaining a pair of the differential and a function identifier which identifies the function selected in the step of function selection.

7. An electronic dictionary comprising:

a dictionary medium;

dictionary data composed of a plurality of dictionary data elements and stored in the dictionary medium; and an index file showing storage positions of all dictionary data elements stored in the dictionary medium, wherein the index file is a differential index in which each item is expressed by a differential between a pointer showing a storage position of a dictionary data element and a given function value, the index file including function information for obtaining a given function value, and wherein each item of the differential index file is expressed by a bit length equal to or shorter than maximum bit length for showing a storage position of a dictionary data element, the differential index file including identifiers for identifying the function information, each piece of which is related to one of a plurality of blocks, each of the plurality of blocks being composed of a plurality of serial dictionary data elements.

8. A method of producing an electronic dictionary comprising:

a dictionary medium;

dictionary data composed of a plurality of dictionary data elements and stored in the dictionary medium; and an index file showing storage positions of all dictionary data elements and being stored in the dictionary medium, having the steps of:

dictionary data storing for storing dictionary data in a first area in the dictionary medium;

index file inputting for inputting an index file composed of pointers, each showing a storage position of a data element;

first prediction function creating for creating a function, which predicts each pointer, from the last pointer input in the index file inputting step and the last index number;

first prediction function calculating for calculating a prediction pointer by substituting an index number into the function created in the first prediction function creating step;

first differential calculating for calculating a differential between a pointer input in the index file inputting step and its corresponding prediction pointer calculated in the first prediction function calculating step;

differential range inputting for inputting upper and lower limits of a differential;

differential determining for determining whether each differential calculated in the first differential calculating step is within the differential range input in the differential range inputting step;

first data storing for storing the differential calculated in the first differential calculating step and the function created in the first prediction function creating step into a second area in the dictionary medium when the differential is within the differential range;

block dividing for calculating an amount of change of increments of all pointers input in the index file inputting step and dividing the index file at a pointer whose amount of change of increment exceeds a given value, when the differential is not within the differential range;

second prediction function creating for creating different functions for predicting each pointer in each block divided in the block dividing step;

list creating for creating a list of the blocks divided in the block dividing step and the functions created in the second prediction function creating step;

second prediction function calculating for calculating a prediction pointer by substituting an index number into the function create din the list creating step;

second differential calculating for calculating a differential between a pointer input in the index file inputting step and its corresponding prediction pointer calculated in the second prediction function calculating step; and second data storing for storing the list created in the list creating step and the differential calculated in the second differential calculating step into the second area in the dictionary medium.

9. The method of producing the electronic dictionary of claim 8, wherein the functions created in the first and the second prediction creating steps are linear functions.

10. An electronic dictionary for determining the meaning of words through computations of a computer comprising:

a dictionary medium that can be loaded into a computer;

dictionary data representing words are stored in a plurality of dictionary data elements in the dictionary medium; and a differential index, compressed and stored in the medium, includes storage position data of all dictionary data elements and function data for obtaining a given function value wherein each item is expressed by a differential between a pointer showing a storage position of a dictionary data element and the given function value and each function value is related to a corresponding block of a plurality of serial dictionary data elements.

* * * * *